US012626489B2

(12) United States Patent　　(10) Patent No.: US 12,626,489 B2
Revaud et al.　　(45) Date of Patent: May 12, 2026

(54) SYSTEM AND METHOD USING PYRAMIDAL AND UNIQUENESS MATCHING PRIORS FOR IDENTIFYING CORRESPONDENCES BETWEEN IMAGES

(71) Applicant: NAVER CORPORATION, Gyeonggi-do (KR)

(72) Inventors: Jérome Revaud, Meylan (FR); Vincent Leroy, Laval (FR); Philippe Weinzaepfel, Montbonnot-Saint-Martin (FR); Boris Chidlovskii, Meylan (FR)

(73) Assignee: NAVER CORPORATION, Gyeonggi-Do (KR)

( * ) Notice: Subject to any disclaimer, the term of this patent is extended or adjusted under 35 U.S.C. 154(b) by 598 days.

(21) Appl. No.: 18/103,074

(22) Filed: Jan. 30, 2023

(65) Prior Publication Data

US 2023/0306718 A1　　Sep. 28, 2023

(30) Foreign Application Priority Data

Mar. 28, 2022　(EP) ..................................... 22305384

(51) Int. Cl.
　*G06V 10/771*　　(2022.01)
　*G06T 3/40*　　(2006.01)
　　　(Continued)

(52) U.S. Cl.
　CPC .............. *G06V 10/771* (2022.01); *G06T 3/40* (2013.01); *G06T 7/11* (2017.01); *G06V 10/751* (2022.01);
　　　(Continued)

(58) Field of Classification Search
　CPC .... G06V 10/771; G06V 10/751; G06V 10/82; G06V 10/454; G06V 10/74;
　　　(Continued)

(56) References Cited

U.S. PATENT DOCUMENTS 11,176,425 B2　11/2021　Revaud et al.
2022/0028110 A1　1/2022　Detone et al.

OTHER PUBLICATIONS

Revaud, Jerome, et al. "DeepMatching: Hierarchical Deformable Dense Matching." arXiv preprint arXiv:1506.07656 (2015). https://arxiv.org/abs/1506.07656 (Year: 2015).*

(Continued)

*Primary Examiner* — Han Hoang

(57)　　　ABSTRACT

A computer-implemented method includes: obtaining a pair of images depicting a same scene, the pair of images including a first image with a first pixel grid and a second image with a second pixel grid, the first pixel grid different than the second pixel grid; by a neural network module having a first set of parameters: generating a first feature map based on the first image; and generating a second feature map based on the second image; determining a first correlation volume based on the first and second feature maps; iteratively determining a second correlation volume based on the first correlation volume; determining a loss for the first and second feature maps based on the second correlation volume; generating a second set of the parameters based on minimizing a loss function using the loss; and updating the neural network module to include the second set of parameters.

24 Claims, 8 Drawing Sheets

(51) Int. Cl.
  *G06T 7/11*       (2017.01)
  *G06V 10/75*      (2022.01)
  *G06V 10/82*      (2022.01)
(52) U.S. Cl.
  CPC .... *G06V 10/82* (2022.01); *G06T 2207/20016*
          (2013.01); *G06T 2207/20081* (2013.01)
(58) Field of Classification Search
  CPC .... G06V 10/225; G06V 10/40; G06V 10/774;
              G06T 3/40; G06T 7/11; G06T
          2207/20016; G06T 2207/20081; G06T
          2207/20084; G06T 7/33; G06N 3/088
  See application file for complete search history.

(56)                References Cited

OTHER PUBLICATIONS

Truong, Prune, et al. "Learning Accurate Dense Correspondences and When to Trust Them." arXiv preprint arXiv:2101.01710 (2021). https://arxiv.org/pdf/2101.01710 (Year: 2021).*
Kim, Jaechul, et al. "Deformable Spatial Pyramid Matching for Fast Dense Correspondences." 2013 IEEE Conference on Computer Vision and Pattern Recognition. IEEE, 2013.https://ieeexplore.ieee.org/abstract/document/6619143 (Year: 2013).*
Balntas, Vassileios, Karel Lenc, Andrea Vedaldi, and Krystian Mikolajczyk. "HPatches: A Benchmark and Evaluation of Hand-crafted and Learned Local Descriptors," CVPR 2017.
Berton, Gabriele, Carlo Masone, Valerio Paolicelli, and Barbara Caputo. "Viewpoint Invariant Dense Matching for Visual Geolocalization." In *2021 IEEE/CVF International Conference on Computer Vision (ICCV)*, 12149-58. Montreal, QC, Canada: IEEE, 2021.
Bhowmik, Aritra, Stefan Gumhold, Carsten Rother, and Eric Brachmann. "Reinforced Feature Points: Optimizing Feature Detection and Description for a High-Level Task." In *2020 IEEE/CVF Conference on Computer Vision and Pattern Recognition (CVPR)*, 4947-56. Seattle, WA, USA: IEEE, 2020.
Bian, JiaWang, Wen-Yan Lin, Yasuyuki Matsushita, Sai-Kit Yeung, Tan-Dat Nguyen, and Ming-Ming Cheng. "GMS: Grid-Based Motion Statistics for Fast, Ultra-Robust Feature Correspondence," IJCV 2020.
Cadena, Cesar, Luca Carlone, Henry Carrillo, Yasir Latif, Davide Scaramuzza, Jose Neira, Ian Reid, and John J. Leonard. "Past, Present, and Future of Simultaneous Localization and Mapping: Toward the Robust-Perception Age." *IEEE Transactions on Robotics*, 2016.
Chen, Hongkai, Zixin Luo, Jiahui Zhang, Lei Zhou, Xuyang Bai, Zeyu Hu, Chiew-Lan Tai, and Long Quan. "Learning to Match Features with Seeded Graph Matching Network." In *2021 IEEE/CVF International Conference on Computer Vision (ICCV)*, 6281-90. Montreal, QC, Canada: IEEE, 2021.
Chen, Ting, Simon Kornblith, Mohammad Norouzi, and Geoffrey Hinton. "A Simple Framework for Contrastive Learning of Visual Representations," ICML 2020.
Darmon, Francois, Mathieu Aubry, and Pascal Monasse. "Learning to Guide Local Feature Matches." In *2020 International Conference on 3D Vision (3DV)*, 1127-36. Fukuoka, Japan: IEEE, 2020.
DeTone, Daniel, Tomasz Malisiewicz, and Andrew Rabinovich. "SuperPoint: Self-Supervised Interest Point Detection and Description." In *2018 IEEE/CVF Conference on Computer Vision and Pattern Recognition Workshops (CVPRW)*, 337-33712. Salt Lake City, UT, USA: IEEE, 2018.
Dusmanu, Mihai, Ignacio Rocco, Tomas Pajdla, Marc Pollefeys, Josef Sivic, Akihiko Torii, and Torsten Sattler. "D2-Net: A Trainable CNN for Joint Description and Detection of Local Features." In *2019 IEEE/CVF Conference on Computer Vision and Pattern Recognition (CVPR)*, 8084-93. Long Beach, CA, USA: IEEE, 2019.

El Banani, Mohamed, and Justin Johnson. "Bootstrap Your Own Correspondences." In *2021 IEEE/CVF International Conference on Computer Vision (ICCV)*, 6413-22. Montreal, QC, Canada: IEEE, 2021.
European Search Report for Application No. 22305384.4 dated Oct. 13, 2022.
Germain, Hugo, Guillaume Bourmaud, and Vincent Lepetit. "S2DNet: Learning Image Features for Accurate Sparse-to-Dense Matching." In *Computer Vision—ECCV 2020*, edited by Andrea Vedaldi, Horst Bischof, Thomas Brox, and Jan-Michael Frahm, 12348:626-43. Lecture Notes in Computer Science. Cham: Springer International Publishing, 2020.
Germain, Hugo, Vincent Lepetit, and Guillaume Bourmaud. "Neural Reprojection Error: Merging Feature Learning and Camera Pose Estimation." In *2021 IEEE/CVF Conference on Computer Vision and Pattern Recognition (CVPR)*, 414-23. Nashville, TN, USA: IEEE, 2021.
Germain, Hugo, Vincent Lepetit, and Guillaume Bourmaud. "Visual Correspondence Hallucination," ICLR, 2022.
Guizilini, Vitor, Rares Ambrus, Sudeep Pillai, Allan Raventos, and Adrien Gaidon. "3D Packing for Self-Supervised Monocular Depth Estimation." In *2020 IEEE/CVF Conference on Computer Vision and Pattern Recognition (CVPR)*, 2482-91. Seattle, WA, USA: IEEE, 2020.
Harris, C., and M. Stephens. "A Combined Corner and Edge Detector." In *Proceedings of the Alvey Vision Conference 1988*, 23.1-23.6. Manchester: Alvey Vision Club, 1988.
He, Kaiming, Haoqi Fan, Yuxin Wu, Saining Xie, and Ross Girshick. "Momentum Contrast for Unsupervised Visual Representation Learning." In *2020 IEEE/CVF Conference on Computer Vision and Pattern Recognition (CVPR)*, 9726-35. Seattle, WA, USA: IEEE, 2020.
He, Kun, Yan Lu, and Stan Sclaroff. "Local Descriptors Optimized for Average Precision," CVPR 2018.
Hong, Sunghwan, and Seungryong Kim. "Deep Matching Prior: Test-Time Optimization for Dense Correspondence." In *2021 IEEE/CVF International Conference on Computer Vision (ICCV)*, 9887-97. Montreal, QC, Canada: IEEE, 2021.
Humenberger, Martin, Yohann Cabon, Nicolas Guerin, Julien Morat, Vincent Leroy, Jérôme Revaud, Philippe Rerole, Noe Pion, Cesar de Souza, and Gabriela Csurka. "Robust Image Retrieval-Based Visual Localization Using Kapture." arXiv, Jan. 7, 2022.
Jiang, Wei, Eduard Trulls, Jan Hosang, Andrea Tagliasacchi, and Kwang Moo Yi. "COTR: Correspondence Transformer for Matching Across Images." In *2021 IEEE/CVF International Conference on Computer Vision (ICCV)*, 6187-97. Montreal, QC, Canada: IEEE, 2021.
Kingma, Diederik P., and Jimmy Ba. "Adam: A Method for Stochastic Optimization." arXiv, Jan. 29, 2017.
Kolesnikov, Alexander, Xiaohua Zhai, and Lucas Beyer. "Revisiting Self-Supervised Visual Representation Learning." In *2019 IEEE/CVF Conference on Computer Vision and Pattern Recognition (CVPR)*, 1920-29. Long Beach, CA, USA: IEEE, 2019.
Kundu, Jogendra Nath, M. V. Rahul, Aditya Ganeshan, and R. Venkatesh Babu. "Object Pose Estimation from Monocular Image Using Multi-View Keypoint Correspondence." In *Computer Vision—ECCV 2018 Workshops*, edited by Laura Leal-Taixé and Stefan Roth, 11131:298-313. Lecture Notes in Computer Science. Cham: Springer International Publishing, 2019.
Laguna, Axel Barroso, Edgar Riba, Daniel Ponsa, and Krystian Mikolajczyk. "Key.Net: Keypoint Detection by Handcrafted and Learned CNN Filters." In *2019 IEEE/CVF International Conference on Computer Vision (ICCV)*, 5835-43. Seoul, Korea (South): IEEE, 2019.
Laskar, Zakaria, Iaroslav Melekhov, Hamed R. Tavakoli, and Juha Ylioinas. "Geometric Image Correspondence Verification by Dense Pixel Matching." In *2020 IEEE Winter Conference on Applications of Computer Vision (WACV)*, 2510-19. Snowmass Village, CO, USA: IEEE, 2020.
Li, Shuda, Kai Han, Theo W. Costain, Henry Howard-Jenkins, and Victor Prisacariu. "Correspondence Networks With Adaptive Neighbour-

(56) References Cited

OTHER PUBLICATIONS hood Consensus." In *2020 IEEE/CVF Conference on Computer Vision and Pattern Recognition (CVPR)*, 10193-202. Seattle, WA, USA: IEEE, 2020.

Li, Xinghui, Kai Han, Shuda Li, and Victor Prisacariu. "Dual-Resolution Correspondence Networks," NeurIPS, 2020.

Li, Yijun, Ming-Yu Liu, Xueting Li, Ming-Hsuan Yang, and Kautz Jan. "A Closed-Form Solution to Photorealistic Image Stylization," ECCV 2018.

Li, Zhengqi, and Noah Snavely. "MegaDepth: Learning Single-View Depth Prediction from Internet Photos." In *2018 IEEE/CVF Conference on Computer Vision and Pattern Recognition*, 2041-50. Salt Lake City, UT, USA: IEEE, 2018.

Lin, Wen-Yan, Fan Wang, Ming-Ming Cheng, Sai-Kit Yeung, Philip H.S. Torr, Minh N. Do, and Jiangbo Lu. "Code: Coherence Based Decision Boundaries for Feature Correspondence." *IEEE Transactions on Pattern Analysis and Machine Intelligence*, 2018.

Liu, Yuan, Zehong Shen, Zhixuan Lin, and Sida Peng. "Gift: Learning Transformation-Invariant Dense Visual Descriptors via Group CNNs," NeurIPS, 2019.

Lowe, D.G. "Object Recognition from Local Scale-Invariant Features." In *Proceedings of the Seventh IEEE International Conference on Computer Vision*, 1150-57 vol. 2. Kerkyra, Greece: IEEE, 1999.

Luo, Zixin, Lei Zhou, Xuyang Bai, Hongkai Chen, Jiahui Zhang, Yao Yao, Shiwei Li, Tian Fang, and Long Quan. "ASLFeat: Learning Local Features of Accurate Shape and Localization." In *2020 IEEE/CVF Conference on Computer Vision and Pattern Recognition (CVPR)*, 6588-97. Seattle, WA, USA: IEEE, 2020.

Luo, Zixin, Tianwei Shen, Lei Zhou, Jiahui Zhang, Yao Yao, Shiwei Li, Tian Fang, and Long Quan. "ContextDesc: Local Descriptor Augmentation With Cross-Modality Context." In *2019 IEEE/CVF Conference on Computer Vision and Pattern Recognition (CVPR)*, 2522-31. Long Beach, CA, USA: IEEE, 2019.

Luo, Zixin, Tianwei Shen, Lei Zhou, Siyu Zhu, Runze Zhang, Yao Yao, Tian Fang, and Long Quan. "GeoDesc: Learning Local Descriptors by Integrating Geometry Constraints." In *Computer Vision—ECCV 2018*.

Ma, Jiayi, Ji Zhao, Junjun Jiang, Huabing Zhou, and Xiaojie Guo. "Locality Preserving Matching." *International Journal of Computer Vision*, 2019.

Ma, Jiayi, Xingyu Jiang, Aoxiang Fan, Junjun Jiang, and Junchi Yan. "Image Matching from Handcrafted to Deep Features: A Survey." *International Journal of Computer Vision*, 2021.

Meister, Simon, Junhwa Hur, and Stefan Roth. "UnFlow: Unsupervised Learning of Optical Flow With a Bidirectional Census Loss." *Proceedings of the AAAI Conference on Artificial Intelligence*, 2018.

Melekhov, Iaroslav, Aleksei Tiulpin, Torsten Sattler, Marc Pollefeys, Esa Rahtu, and Juho Kannala. "DGC-Net: Dense Geometric Correspondence Network." In *2019 IEEE Winter Conference on Applications of Computer Vision (WACV)*, 1034-42. Waikoloa Village, HI, USA: IEEE, 2019.

Melekhov, Iaroslav, Zakaria Laskar, Xiaotian Li, Shuzhe Wang, and Juho Kannala. "Digging Into Self-Supervised Learning of Feature Descriptors." In *2021 International Conference on 3D Vision (3DV)*, 1144-55. London, United Kingdom: IEEE, 2021.

Mishkin, Dmytro, Filip Radenović, and Jiři Matas. "Repeatability Is Not Enough: Learning Affine Regions via Discriminability." In *Computer Vision—ECCV*, 2018.

Moravec, Hans P. "Rover Visual Obstacle Avoidance," IJCAI, 1981.

Paszke, Adam, Sam Gross, Soumith Chintala, Gregory Chanan, Edward Yang, Zachary DeVito, Zeming Lin, Alban Desmaison, Luca Antiga, and Adam Lerer. "Automatic Differentiation in PyTorch," NIPS, 2017.

Radenovic, Filip, Ahmet Iscen, Giorgos Tolias, Yannis Avrithis, and Ondrej Chum. "Revisiting Oxford and Paris: Large-Scale Image Retrieval Benchmarking." In *2018 IEEE/CVF Conference on Computer Vision and Pattern Recognition*, 2018.

Revaud, Jerome, Jon Almazan, Rafael Rezende, and Cesar De Souza. "Learning With Average Precision: Training Image Retrieval With a Listwise Loss." In *2019 IEEE/CVF International Conference on Computer Vision (ICCV)*, 5106-15. Seoul, Korea (South): IEEE, 2019.

Revaud, Jerome, Philippe Weinzaepfel, Cesar De Souza, and Martin Humenberger. "R2D2: Repeatable and Reliable Detector and Descriptor," NeurIPS, 2019.

Revaud, Jerome, Philippe Weinzaepfel, Zaid Harchaoui, and Cordelia Schmid. "DeepMatching: Hierarchical Deformable Dense Matching." *International Journal of Computer Vision*, 2016.

Rocco, Ignacio, Mircea Cimpoi, Relja Arandjelovi?, Akihiko Torii, Tomas Pajdla, and Josef Sivic. "Neighbourhood Consensus Networks," NeurIPS, 2018.

Rocco, Ignacio, Relja Arandjelovic, and Josef Sivic. "Convolutional Neural Network Architecture for Geometric Matching," 2018.

Rocco, Ignacio, Relja Arandjelovic, and Josef Sivic. "Efficient Neighbourhood Consensus Networks via Submanifold Sparse Convolutions." In *Computer Vision—ECCV*, 2020.

Rublee, Ethan, Vincent Rabaud, Kurt Konolige, and Gary Bradski. "ORB: An Efficient Alternative to Sift or Surf." In *2011 International Conference on Computer Vision*, 2564-71. Barcelona, Spain: IEEE, 2011.

Sarlin, Paul-Edouard, Daniel DeTone, Tomasz Malisiewicz, and Andrew Rabinovich. "SuperGlue: Learning Feature Matching With Graph Neural Networks." In *2020 IEEE/CVF Conference on Computer Vision and Pattern Recognition (CVPR)*, 4937-46. Seattle, WA, USA: IEEE, 2020.

Scardapane, Simone, Danilo Comminiello, Amir Hussain, and Aurelio Uncini. "Group Sparse Regularization for Deep Neural Networks." arXiv, Jul. 2, 2016.

Schonberger, Johannes L., and Jan-Michael Frahm. "Structure-from-Motion Revisited." In *2016 IEEE Conference on Computer Vision and Pattern Recognition (CVPR)*, 4104-13. Las Vegas, NV, USA: IEEE, 2016.

Schops, Thomas, Johannes L. Schonberger, Silvano Galliani, Torsten Sattler, Konrad Schindler, Marc Pollefeys, and Andreas Geiger. "A Multi-View Stereo Benchmark with High-Resolution Images and Multi-Camera Videos." In *2017 IEEE Conference on Computer Vision and Pattern Recognition (CVPR)*, 2538-47. Honolulu, HI: IEEE, 2017.

Shen, Xi, François Darmon, Alexei A. Efros, and Mathieu Aubry. "Ransac-Flow: Generic Two-Stage Image Alignment." In *Computer Vision—ECCV*, 2020.

Sun, Jiaming, Zehong Shen, Yuang Wang, Hujun Bao, and Xiaowei Zhou. "LoFTR: Detector-Free Local Feature Matching with Transformers." In *2021 IEEE/CVF Conference on Computer Vision and Pattern Recognition (CVPR)*, 8918-27. Nashville, TN, USA: IEEE, 2021.

Taira, Hajime, Masatoshi Okutomi, Torsten Sattler, Mircea Cimpoi, Marc Pollefeys, Josef Sivic, Tomas Pajdla, and Akihiko Torii. "InLoc: Indoor Visual Localization with Dense Matching and View Synthesis." *IEEE Transactions on Pattern Analysis and Machine Intelligence*, 2021.

Teed, Zachary, and Jia Deng. "RAFT: Recurrent All-Pairs Field Transforms for Optical Flow." *ECCV*, 2020.

Thewlis, James, Shuai Zheng, Philip Torr, and Andrea Vedaldi. "Fully-Trainable Deep Matching." In *Procedings of the British Machine Vision Conference 2016*, 145.1-145.12. York, UK: British Machine Vision Association, 2016.

Tian, Yurun, Xin Yu, Bin Fan, Fuchao Wu, Huub Heijnen, and Vassileios Balntas. "SOSNet: Second Order Similarity Regularization for Local Descriptor Learning." In *2019 IEEE/CVF Conference on Computer Vision and Pattern Recognition (CVPR)*, 11008-17. Long Beach, CA, USA: IEEE, 2019.

Tola, Engin, Vincent Lepetit, and Pascal Fua. "A Fast Local Descriptor for Dense Matching." In *2008 IEEE Conference on Computer Vision and Pattern Recognition*, 2008.

Trockman, Asher, and J. Zico Kolter. "Patches Are All You Need?" arXiv, Jan. 24, 2022.

Truong, Prune, Martin Danelljan, and Radu Timofte. "GLU-Net: Global-Local Universal Network for Dense Flow and Correspon-

(56) References Cited

OTHER PUBLICATIONS dences." In *2020 IEEE/CVF Conference on Computer Vision and Pattern Recognition (CVPR)*, 6257-67. Seattle, WA, USA: IEEE, 2020.

Truong, Prune, Martin Danelljan, Fisher Yu, and Luc Van Gool. "Warp Consistency for Unsupervised Learning of Dense Correspondences." In *2021 IEEE/CVF International Conference on Computer Vision (ICCV)*, 10326-36. Montreal, QC, Canada: IEEE, 2021.

Truong, Prune, Martin Danelljan, Luc Van Gool, and Radu Timofte. "Learning Accurate Dense Correspondences and When to Trust Them." In *2021 IEEE/CVF Conference on Computer Vision and Pattern Recognition (CVPR)*, 5710-20. Nashville, TN, USA: IEEE, 2021.

Verdie, Yannick, Kwang Moo Yi, Pascal Fua, and Vincent Lepetit. "TILDE: A Temporally Invariant Learned DEtector." In *2015 IEEE Conference on Computer Vision and Pattern Recognition (CVPR)*, 5279-88. Boston, MA, USA: IEEE, 2015.

Wang, Bing, Changhao Chen, Zhaopeng Cui, Jie Qin, Chris Xiaoxuan Lu, Zhengdi Yu, Peijun Zhao, et al. "P2-Net: Joint Description and Detection of Local Features for Pixel and Point Matching." In *2021 IEEE/CVF International Conference on Computer Vision (ICCV)*, 15984-93. Montreal, QC, Canada: IEEE, 2021.

Wang, Jianyuan, Yiran Zhong, Yuchao Dai, Stan Birchfield, Kaihao Zhang, Nikolai Smolyanskiy, and Hongdong Li. "Deep Two-View Structure-from-Motion Revisited." In *2021 IEEE/CVF Conference on Computer Vision and Pattern Recognition (CVPR)*, 8949-58. Nashville, TN, USA: IEEE, 2021.

Wang, Qianqian, Xiaowei Zhou, Bharath Hariharan, and Noah Snavely. "Learning Feature Descriptors Using Camera Pose Supervision." In *Computer Vision—ECCV*, 2020.

Wang, Xiaolong, Allan Jabri, and Alexei A. Efros. "Learning Correspondence From the Cycle-Consistency of Time." In *2019 IEEE/CVF Conference on Computer Vision and Pattern Recognition*, 2019.

Weinzaepfel, Philippe, Revaud, Jerome, Harchaoui, Zaid, and Schmid, Cordelia "DeepFlow: Large displacement optical flow tih deep matching", IEEE International Conference on Computer Vision; 2013.

Yang, Guandao, Tomasz Malisiewicz, and Serge Belongie. "Learning Data-Adaptive Interest Points through Epipolar Adaptation," CVPR, 2019.

Yang, Heng, Wei Dong, Luca Carlone, and Vladlen Koltun. "Self-Supervised Geometric Perception." In *2021 IEEE/CVF Conference on Computer Vision and Pattern Recognition (CVPR)*, 14345-56. Nashville, TN, USA: IEEE, 2021.

Yao, Yuan, Yasamin Jafarian, and Hyun Soo Park. "Monet: Multiview Semi-Supervised Keypoint Detection via Epipolar Divergence." In *2019 IEEE/CVF International Conference on Computer Vision (ICCV)*, 753-62. Seoul, Korea (South): IEEE, 2019.

Zhang, Xu, Felix X. Yu, Svebor Karaman, and Shih-Fu Chang. "Learning Discriminative and Transformation Covariant Local Feature Detectors." In *2017 IEEE Conference on Computer Vision and Pattern Recognition (CVPR)*, 4923-31. Honolulu, HI: IEEE, 2017.

Zhang, Zichao, Torsten Sattler, and Davide Scaramuzza. "Reference Pose Generation for Long-Term Visual Localization via Learned Features and View Synthesis." *International Journal of Computer Vision*, 2021.

Zhou, Qunjie, Torsten Sattler, and Laura Leal-Taixe. "Patch2Pix: Epipolar-Guided Pixel-Level Correspondences." In *2021 IEEE/CVF Conference on Computer Vision and Pattern Recognition (CVPR)*, 2021.

Zhou, Tinghui, Yong Jae Lee, Stella X. Yu, and Alexei A. Efros. "FlowWeb: Joint Image Set Alignment by Weaving Consistent, Pixel-Wise Correspondences." In *2015 IEEE Conference on Computer Vision and Pattern Recognition (CVPR)*, 1191-1200. Boston, MA, USA: IEEE, 2015.

* cited by examiner

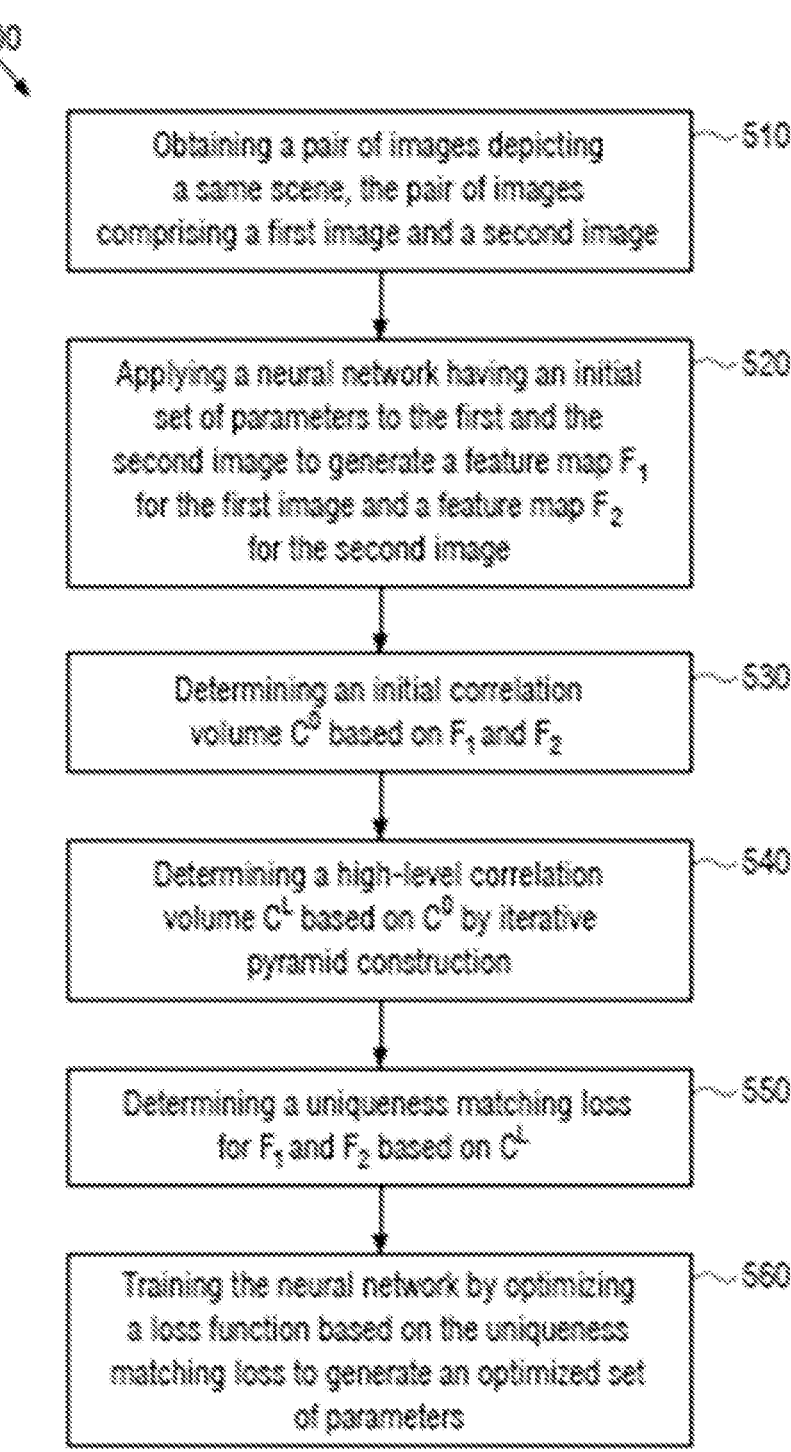

500

Obtaining a pair of images depicting
a same scene, the pair of images
comprising a first image and a second image — S10

Applying a neural network having an initial
set of parameters to the first and the
second image to generate a feature map $F_1$
for the first image and a feature map $F_2$
for the second image — S20

Determining an initial correlation
volume $C^0$ based on $F_1$ and $F_2$ — S30

Determining a high-level correlation
volume $C^L$ based on $C^0$ by iterative
pyramid construction — S40

Determining a uniqueness matching loss
for $F_1$ and $F_2$ based on $C^L$ — S50

Training the neural network by optimizing
a loss function based on the uniqueness
matching loss to generate an optimized set
of parameters — S60

FIG. 5

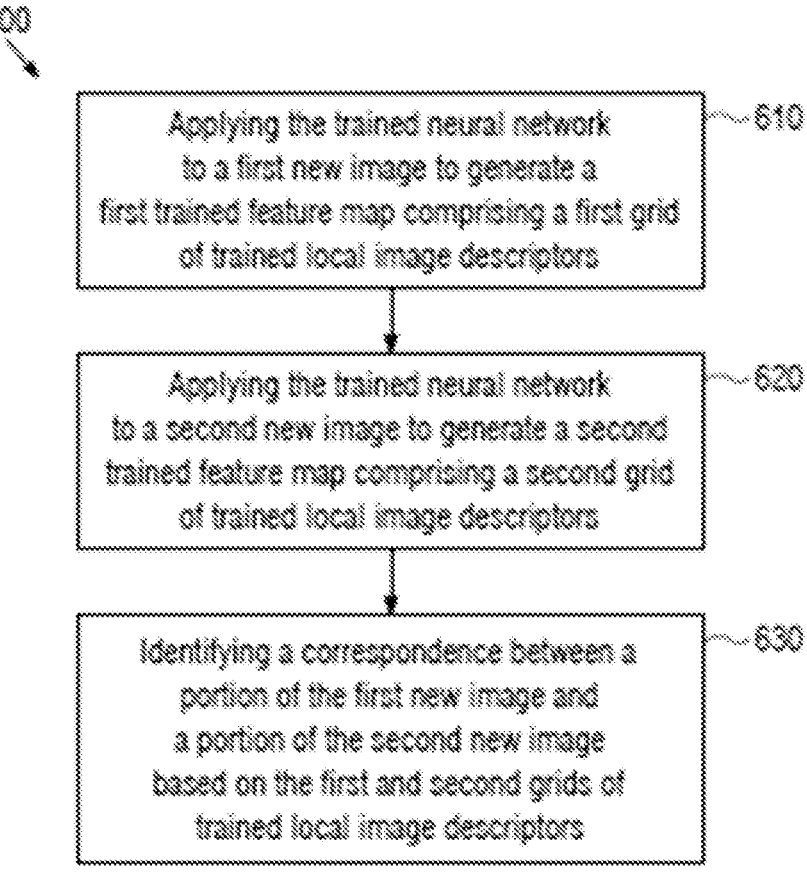

600

Applying the trained neural network
to a first new image to generate a
first trained feature map comprising a first grid
of trained local image descriptors
— 610

Applying the trained neural network
to a second new image to generate a second
trained feature map comprising a second grid
of trained local image descriptors
— 620

Identifying a correspondence between a
portion of the first new image and
a portion of the second new image
based on the first and second grids of
trained local image descriptors
— 630

FIG. 6

SYSTEM AND METHOD USING PYRAMIDAL AND UNIQUENESS MATCHING PRIORS FOR IDENTIFYING CORRESPONDENCES BETWEEN IMAGES

CROSS-REFERENCE TO RELATED APPLICATIONS

This application claims the benefit of European Application No.: EP22305384.4 filed on Mar. 28, 2022. The entire disclosure of the application referenced above is incorporated herein by reference.

FIELD

The present disclosure relates to neural networks for image analysis and more particularly to systems, methods, and computer-readable medium for unsupervised learning of neural networks for computing local image descriptors for determining whether a pair of images depict the same scene.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One of the persistent challenges of computer-based image analysis is the identification of corresponding pixels or portions of two images. This image analysis problem is central to numerous computer vision tasks, such as large-scale visual localization, object detection, pose estimation, Structure-from-Motion (SfM), three dimensional (3D) reconstruction and Simultaneous Localization and Mapping (SLAM). All of these tasks involve identifying corresponding portions of two images depicting at least partially the same visual content.

Two different images representing the same visual content can differ in a wide range of parameters, such as the viewing angle of the depicted motif, position of the motif within the image frame, the camera, lens, and sensor type used to capture the image, lighting and weather conditions, focal length, and/or sharpness, to name just a few. While a human can, even for images that differ markedly from each other, easily identify image parts that show the same feature of a depicted object or person, this task is actually rather complex for computers due to differences in geometry, color and contrast between the images.

Correspondences between images are local image descriptors (also called pixel descriptors) may be identified and extracted from an image. A local image descriptor may characterize a neighborhood of a pixel of the image and provide a computer-processable data structure that enables a computing system to compare local environments of pixels by determining correlations between pixels based on their local image descriptors. Local image descriptors can be extracted from an image sparsely (e.g., only for selected keypoints of the image) or densely (e.g., for each pixel of the image).

Various implementations a process of extracting (i.e. computing) local image descriptors from an image is performed for the quality of the identified correspondences. Existing learning-based approaches for extracting local image descriptors may significantly outperform standard handcrafted methods. Learning-based approaches may be based on training procedures involving the existence of annotated training data sets that include a large number of image pairs for which pixel-level correspondences (e.g., dense ground-truth correspondences). These correspondences may be obtained by considering a large collection of images for a given landmark and building a Structure-from-Motion reconstruction. This pipeline may fail though, yielding a bottleneck to the kind of ground-truth data that can be generated. This may limit the potential of available image data to only those image pairs for which ground-truth labels can be efficiently derived.

Since limited training data sets have a direct negative impact on the training results, it would be beneficial to overcome these restrictions in order to fully exploit the potential of available image pairs as training data sets.

SUMMARY

In order to overcome the above deficiencies, a computer-implemented method for learning local descriptors without supervision is presented. The approach of the method is to jointly enforce two matching priors: local consistency and uniqueness of the matching. The former is based on the observation that two neighboring pixels of one image will likely match with two pixels forming a similar neighboring pair in the other image, up to a small deformation. This may generally hold true at any scale. In disclosed examples, this prior is efficiently enforced through a pyramidal structure. A pyramidal non-parametric module extracts higher-level correspondences, enforcing the local consistency matching prior by design. The uniqueness prior is based on the observation that one pixel from the first image can correspond to at most one pixel in the second image. This property is enforced on high-level correspondences via a uniqueness matching loss. It is naturally propagated to low-level pixel correspondences, thanks to the pyramidal hierarchical structure. As a result, the combination of a local consistency prior and a uniqueness prior enables an effective learning of local image descriptors without supervision.

The resulting training method of a neural network for determining local image descriptors does not require any supervision, e.g., in the form of ground-truth correspondences between training images. The trained neural network is configured to extract optimal local image descriptors. Extracted optimal local image descriptors (also referred to as PUMP descriptors) are configured to identify correspondences between portions of different images, including scenes depicting the same visual content but having differing image parameters, for example, a pair of images of the same scene that differ in viewpoint or lighting conditions.

In an embodiment, a computer-implemented method of unsupervised neural network training for learning of local image descriptors is provided. The method includes: obtaining a pair of images depicting a same scene, the pair of images including a first image with a first pixel grid and a second image with a second pixel grid, where the first pixel grid differs from the second pixel grid; applying a neural network having an initial set of parameters to the first image and the second image to generate a feature map F1 for the first image and a feature map F2 for the second image, F1 including a first grid of local image descriptors and F2 including a second grid of local 30 image descriptors, where each local image descriptor in the first grid of local image descriptors corresponds to a respective pixel within the first pixel grid and each local image descriptor in the second grid of local image descriptors corresponds to a respective pixel within the second pixel grid; determining an initial correlation volume $C0$ based on $F1$ and $F2$, where $C0$ includes local correlations of pixels of the first pixel grid with pixels of the second pixel grid, where each local correlation between a pixel of the first pixel grid and a pixel of the second pixel grid is determined based on the local image descriptors corresponding to the correlated pixels; determining a high-level correlation volume $C1$ based on $Co$ by iterative pyramid construction, where $C1$ includes aggregated high-level correlations between iteratively constructed high-level patches of the first and second pixel grids, each patch being a rectangular portion of the respective pixel grid; determining a uniqueness matching loss for $F1$ and $F2$ based on $C1$, the uniqueness matching loss providing a measure for a deviation of $E1$ and $F2$ from optimal feature maps, where the deviation from optimal feature maps is low if, based on the high-level correlations in $C1$, each high-level patch of the first and the second pixel grids has a unique match among the high-level patches of the respective other pixel grid; and training the neural network by minimizing a loss function based on the uniqueness matching loss to generate an optimized set of parameters, thereby generating a trained neural network for determining optimal local image descriptors.

In a feature, a computer-implemented method for identifying correspondences between a pair of input images is provided. The method includes: receiving the input image pair including a first input image and a second input image; processing the input image pair with the trained neural network for determining optimal local image descriptors, the trained neural network generating local image descriptors for the input image pair described above; extracting correspondences between portions of the input image pair based on the image descriptors, each extracted correspondence mapping a portion of the first input image to a portion of the second input image; determining with the extracted correspondences whether a true match exists between the input image pair, a true match existing between the input image pair when corresponding portions of the image pair depict a same scene; and outputting whether a true match exists between the image pair.

In a feature, a system includes a processing module and a memory connected to the processing module is provided. The memory includes computer-executable instructions that, when executed by the processing module, cause the processing module to perform the computer-implemented method of unsupervised neural network training for learning of local image descriptors and/or the computer-implemented method for identifying correspondences between a pair of input images described above and herein.

In a feature, one or more computer-readable media having computer-readable instructions stored thereon are provided. When executed by a processing module (e.g., including one or more processors), the computer-readable instructions cause the processing module to perform the method of unsupervised neural network training for learning of local image descriptors or the computer-implemented method for identifying correspondences between a pair of input images described above and herein.

In a feature, a computer-implemented method includes: obtaining a pair of images depicting a same scene, the pair of images including a first image with a first pixel grid and a second image with a second pixel grid, wherein the first pixel grid is different than the second pixel grid; by a neural network module having a first set of parameters: generating a first feature map based on the first image; and generating a second feature map based on the second image, the first feature map including a first grid of image descriptors and the second feature map including a second grid of image descriptors, where each local image descriptor in the first grid corresponds to a respective pixel within the first pixel grid and each local image descriptor in the second grid corresponds to a respective pixel within the second pixel grid; determining a first correlation volume based on the first and second feature maps, where the first correlation volume includes correlations of (a) pixels of the first pixel grid with (b) pixels of the second pixel grid, wherein each correlation between a pixel of the first pixel grid and a pixel of the second pixel grid is determined based on the image descriptors corresponding to the correlated pixels; iteratively determining a second correlation volume based on the first correlation volume; determining a loss for the first and second feature maps based on the second correlation volume; generating a second set of the parameters for the neural network module based on minimizing a loss function using the loss; and updating the neural network module to include the second set of parameters thereby generating a trained neural network module.

In further features, the method further includes: by the trained neural network module: generating a third feature map based on a third image, the third feature map including a third grid of image descriptors; and generating a fourth feature map based on a fourth image, the fourth feature map including a fourth grid of image descriptors; and based on the third and fourth grids, identifying a first portion of the third image that corresponds to a second portion of the fourth image.

In further features, the second image is a synthetic version of the first image generated via data augmentation, and iteratively determining the second correlation volume includes determining the second correlation volume using iterative pyramid construction.

In further features, the method further includes: determining a second loss based on the first grid of image descriptors, the second grid of image descriptors, and ground-truth correspondences between the first and second images, where generating the second set of the parameters for the neural network module includes generating the second set of parameters for the neural network module based on minimizing a loss function using the loss and the second loss.

In further features, the method further includes generating the second set of the parameters for the neural network module includes generating the second set of parameters for the neural network module based on minimizing a loss function based on a sum of the loss and the second loss.

In further features, the sum is a weighted sum.

In further features, determining the second correlation volume includes: generating a first level correlation volume based on first-level correlations between first-level patches of the first pixel grid and first-level patches of the second pixel grid; and for N between 1 and $L-1$, iteratively aggregating $N+1$ level correlations of an nth level correlation volume to $N+1$ level correlations between $N+1$ level patches of the first pixel grid and $N+1$ level patches of the second pixel grid.

In further features, the $N+1$ level patches including neighboring N level patches of the respective pixel grid and the aggregated N level correlations correspond to the neighboring N-level patches of the correlated $N+1$ level patches.

In further features, generating the first level correlation volume includes determining a first-level correlations between a first-level patch of the first pixel grid and a first-level patch of the second pixel grid as an averaged sum of correlations between corresponding pixels in the first-level patch of the first pixel grid and the first-level patch of the second pixel grid.

In further features, each N+1 level patch includes 2×2 n-level patches of the respective pixel grid.

In further features, determining the N-th level correlation volume includes performing a rectification transformation for each N-level correlation of the N-th level correlation volume.

In further features, the first correlation volume has a first dimension corresponding to a first dimension of the first feature map and a second dimension corresponding to a second dimension of the first feature map.

In further features, generating the first correlation volume includes subsampling the first feature map by a predetermined factor in the first and second dimensions and generating a subsampled feature map having a third dimension that is less than the first dimension and a fourth dimension that is less than the second dimension.

In further features, subsampling the first feature map includes: dividing the first pixel grid in non-overlapping patches, each patch including a plurality of pixels; and for each patch, determining one descriptor based on the image descriptors corresponding to the pixels of that patch, wherein the one descriptor represents all pixels of that patch in the subsampled feature map.

In further features, determining the first correlation volume includes for each patch of the first pixel grid, determining correlations of the patch with each pixel of the second pixel grid, each correlation being determined based on the one descriptor representing the respective patch in the subsampled feature map and the one descriptor of the second feature map corresponding to the correlated pixel of the second pixel grid.

In further features, each patch has a size of 4×4 pixels, the first dimension is 4× the third dimension, and the second dimension is 4× the fourth dimension.

In further features, the method further includes: using the trained neural network module and the second set of parameters, extracting correspondences between portions of a second image pair; based on the extracted correspondences, determining whether the portions of the second image pair include the same scene; and outputting an indicator of whether the portions of the second image pair include the same scene.

In a feature, a system includes: a neural network module configured to, using trainable parameters: generate a first feature map based on a first image of an image pair; and generate a second feature map based on a second image of the image pair, the first feature map including a first grid of image descriptors and the second feature map including a second grid of image descriptors, at least a portion of the first image including a scene and at least a portion of the second image including the scene; a correlation module configured to determine a loss based on the first and second feature maps; and a training module configured to train the trainable parameters based on minimizing the loss.

In further features, the training module is configured to train the trainable parameters without labels indicative of correspondences between the portions of the first and second images.

In further features, a matching module is configured to, after the training: extract correspondences between feature maps generated by the neural network module based on received images, respectively; based on the correspondences, determine whether the received images include the same scene; and output an indicator of whether the received images include the same scene.

In a feature, a computer-implemented method for identifying correspondences between a pair of input images includes: receiving the input image pair including a first input image and a second input image; processing the input image pair with a neural network trained by performing a method of unsupervised learning of local image descriptors, the trained neural network generating local image descriptors for the input image pair; extracting correspondences between portions of the input image pair based on the image descriptors, each extracted correspondence mapping a portion of the first input image to a portion of the second input image; determining with the extracted correspondences whether a true match exists between the input image pair, a true match existing between the input image pair when corresponding portions of the image pair depict a same scene; and outputting whether a true match exists between the image pair; where the method of unsupervised learning of local image descriptors for training the neural network includes: obtaining a first pair of training images depicting a same scene, the pair of training images including a first training image with a first pixel grid and a second training image with a second pixel grid, where the first pixel grid differs from the second pixel grid; applying the neural network having an initial set of parameters to the first training image and the second training image to generate a first feature map for the first training image and a second feature map for the second training image, the first feature map including a first grid of local image descriptors and the second feature map comprising a second grid of local image descriptors, where each local image descriptor in the first grid of local image descriptors corresponds to a respective pixel within the first pixel grid and each local image descriptor in the second grid of local image descriptors corresponds to a respective pixel within the second pixel grid; determining an initial correlation volume based on the first and second feature maps, where the initial correlation volume comprises local correlations of pixels of the first pixel grid with pixels of the second pixel grid, wherein each local correlation between a pixel of the first pixel grid and a pixel of the second pixel grid is determined based on the local image descriptors corresponding to the correlated pixels; iteratively determining a second correlation volume based on the initial correlation volume, where the second correlation volume includes aggregated high-level correlations between iteratively constructed high-level patches of the first and second pixel grids; determining a uniqueness matching loss for the first and second feature maps based on the second correlation volume, the uniqueness matching loss providing a measure for a deviation of the first and second feature maps from optimal feature maps; and training the neural network by minimizing a loss function based on the uniqueness matching loss to generate an optimized set of parameters.

In a feature, a computer-implemented method of unsupervised neural network training, the method includes: obtaining a first pair of images depicting a same scene, the pair of images including a first image with a first pixel grid and a second image with a second pixel grid, where the first pixel grid differs from the second pixel grid; applying a neural network having an initial set of parameters to the first image and the second image to generate a first feature map for the first image and a second feature map for the second image, the first feature map comprising a first grid of local image descriptors and the second feature map comprising a second grid of local image descriptors, where each local image descriptor in the first grid of local image descriptors corresponds to a respective pixel within the first pixel grid and each local image descriptor in the second grid of local image descriptors corresponds to a respective pixel within the second pixel grid; determining an initial correlation volume based on the first and second feature maps, where the initial correlation volume comprises local correlations of pixels of the first pixel grid with pixels of the second pixel grid, wherein each local correlation between a pixel of the first pixel grid and a pixel of the second pixel grid is determined based on the local image descriptors corresponding to the correlated pixels; iteratively determining a second correlation volume based on the initial correlation volume, wherein the second correlation volume comprises aggregated correlations between iteratively constructed patches of the first and second pixel grids; determining a uniqueness matching loss for the first and second feature maps based on the second correlation volume, the uniqueness matching loss providing a measure for a deviation of the first and second feature maps from optimal feature maps; and training the neural network by minimizing a loss function based on the uniqueness matching loss to generate an optimized set of parameters, thereby generating a trained neural network adapted for determining optimal local image descriptors.

In further features, iteratively determining the second correlation volume based on the first correlation volume is determined by iterative pyramid construction, and wherein each patch is a rectangular portion of the respective pixel grid.

In further features, the measure of deviation from optimal feature maps is low if, based on the high-level correlations in the second correlation volume, each patch of the first and the second pixel grids has a unique match among the patches of the respective other pixel grid.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a functional block diagram illustrating a method of training a neural network;

FIG. 6 is a functional block diagram illustrating a method for determining correspondences between images of an image pair;

In the drawings, reference numbers may be reused to identify similar and/or identical elements.

DETAILED DESCRIPTION

A first step to a solution of the problems described above may be provided by pure self-supervised learning approaches, which may rely on ground-truth labeled correspondences between images but that can generate the correspondences as part of the approach with limited effort. Purely self-supervised learning approaches may use synthetically generated image pairs in the training phase, where the second image is obtained by applying known transformations to the first image, such as a random homography, color jittering, or even style transfer.

However, homographies and the like may not model the full range of possible transformations between real image pairs. In parallel, weakly supervised methods may demonstrate the ability to train from, for example, known camera poses. However, this may only be achievable through the use of complex acquisition setups that involve the deployment of sensors based on different modalities (inertial measurement unit (IMU) or global positioning system (GPS)), or again, resort to SfM reconstructions.

Unsupervised learning of local descriptors may involve cycle consistency constraints across multiple images, either involving extraction of features on more images for training, or costly iterative training of descriptors and expensive model fitting.

Described herein are systems and methods for unsupervised neural network training for learning of local image descriptors. For purposes of explanation, numerous examples and specific details are set forth in order to provide a thorough understanding of the described embodiments. Examples in the claims may include some or all of the features in these examples alone or in combination with other features described below, and may further include modifications and equivalents of the features and concepts described herein. The illustrative examples will be described with reference to the drawings, wherein like elements and structures may be indicated by like reference numbers.

The present invention relates to methods, systems, and computer-readable medium for unsupervised neural network training for learning of image descriptors that are adapted for the determination of corresponding portions in images showing the same visual content. The present application achieves unsupervised neural network module training for learning of image descriptors by configuring a neural network such that the neural network module, when applied to a given image I of dimension H×W, extracts a highly discriminative yet robust local image descriptor for each pixel of I. In order to obtain a neural network module able to extract such local image descriptors, the neural network module is first be trained. Local image descriptors extracted from an image by a neural network module trained according to examples are denoted PUMP (Pyramidal and Uniqueness matching Priors) descriptors.

Figure 1:
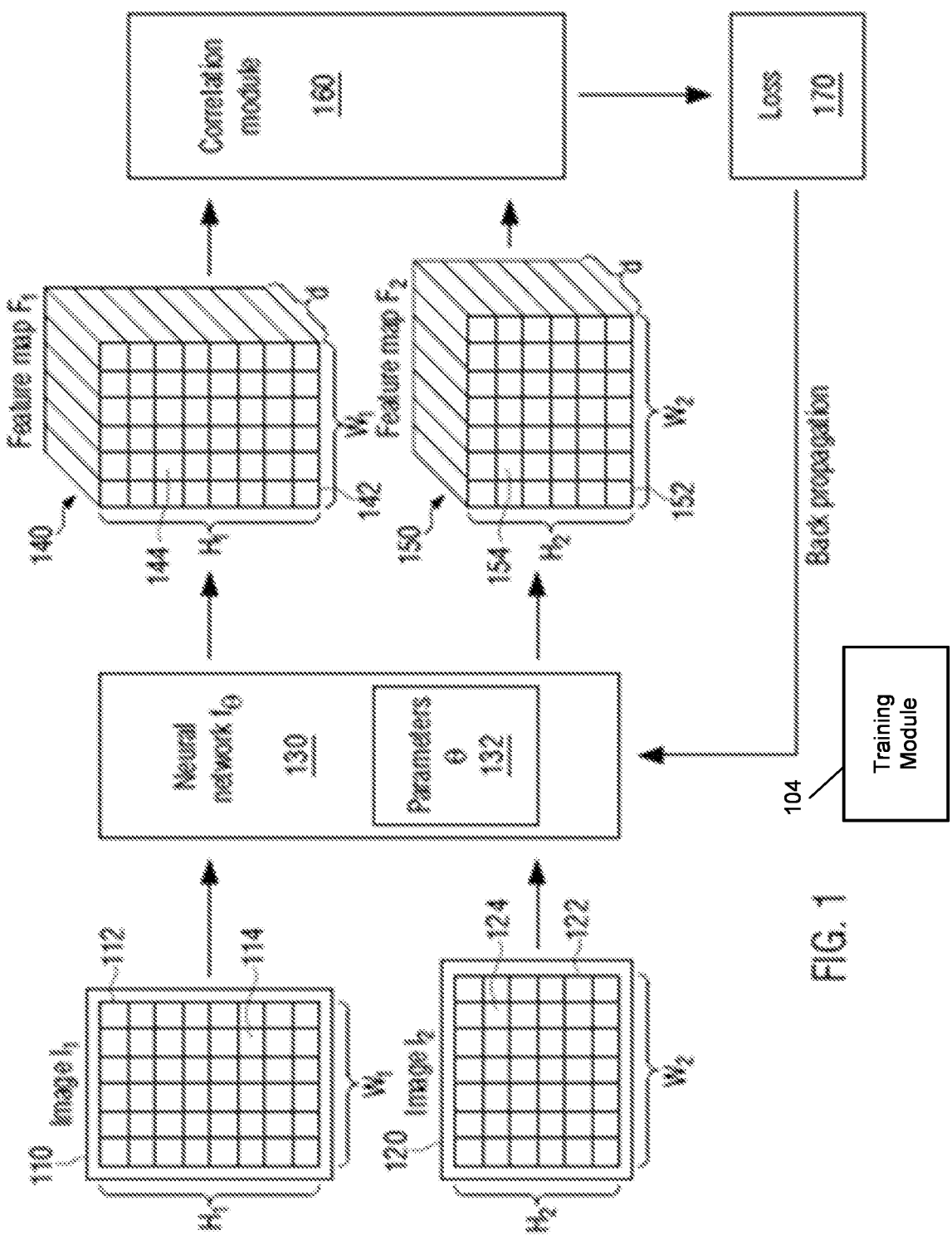
FIG. 1 illustrates a procedure for training a neural network module for determining correspondences between images of an image pair.

FIG. 1 illustrates a functional block diagram of an example training system for training (or a training phase) of a neural network module $f_\theta$ 130. The neural network module $f_\theta$ 130 has a plurality of internal, learnable parameters $\theta$ 132. A training module 104 trains the neural network module 130 as discussed herein. The training phase of neural network module 130 optimizes the learnable parameters of the neural network module by training it on a training set of image pairs.

In supervised learning/training approaches, known is the expected result for each image pair of the training set (e.g., the corresponding portions of the images of each image pair of the training set are known in terms of binary ground-truth labels for each image pair). However, the present application involves unsupervised learning/training of the neural network module 130, which may mean that the learning/training does not involve supervision (e.g., in the form of known ground-truth correlations between images). The training data for the unsupervised learning includes pairs of images depicting at least partially the same visual content.

The training begins with the neural network module 130 including an initial set of values for the parameters 132. The initial set of values may be set in various ways. For example, the initial values may be calibrated by the training module 104 during an initial training for the neural network module 130. Another option is using setting the parameters 132 to predetermined common values for the parameters $\theta$ 132. In various implementations, the training module 104 may set the initial set of values to a random value for each parameter of the plurality of parameters $\theta$ 132.

In a first step of the training, the training module 104 inputs to the neural network module 130 (with the initial set of values for the parameters 132) two different images $I_1$ 110 and $I_2$ 120 of an image pair. Both images of the pair depict at least partially the same visual content (e.g., a same scene, a same object, a same person, or a same architectural structure). Image $I_1$ 110 may include a pixel grid 112 with height $H_1$ and width $W_1$, including $H_1 \times W_1$ individual pixels 114. Image $I_2$ 120 may include a pixel grid 122 with height $H_2$ and width $W_2$ including $H_2 \times W_2$ individual pixels 124. Although both images depict the same visual content, the pixel grids 112 and 122 may differ from each other because, for example, the images were taken under different lighting conditions, from different camera positions or viewing angles, with different cameras, or using different sensors or lenses.

Mathematically, the neural network module 130 can be described as a function $f\theta : I \to F_1$ where I denotes an image and $F_1 \in \mathbb{R}^{H \times W \times d}$ is a d-dimensional feature map, which can be viewed as a grid of dense local image descriptors. The term dense in this context may denote a one-to-one relation between the pixels of the image I and the local image descriptors of the grid of image descriptors.

Accordingly, applying neural network module 130 to image 11110 generates or extracts a feature map $F_1$ 140 from/based on the image. Feature map 140 includes a grid of local image descriptors with height $H_1$ and width $W_1$, including $H_1 \times W_1$ individual local image descriptors 144, wherein each image descriptor 144 corresponds to a pixel 114 in pixel grid 112 and is represented by a d-dimensional vector in $\mathbb{R}^d$. Similarly, applying neural network module 130 to image $I_2$ 120 generates a feature map $F_2$ 150 from the image 120. Feature map 150 includes a grid of local image descriptors with height $H_2$ and width $W_2$, including $H_2 \times W_2$ individual local image descriptors 154, where each image descriptor 154 corresponds to a pixel 124 in pixel grid 112 and is represented by a d-dimensional vector in $\mathbb{R}^d$.

A correlation module 160 receives the feature maps $F_1$ 140 and $F_2$ 150 and performs a series of steps on the received feature maps to determine a loss 170. The loss 170 can either be determined from a single image pair or as an average over a plurality of image pairs. In the latter case, the training module 104 inputs to the neural network module 130 the images of each of the plurality of image pairs in the same way as described for $I_1$ and $I_2$, thereby generating a respective feature map for each image. The correlation module 160 determines an individual loss for each image pair based on the feature maps of the respective images, and from the plurality of individual losses for the individual image pairs, an average loss for the plurality of image pairs. The specific steps performed by the correlation module 160 are explained in more detail below with reference to FIG. 3.

A loss may denote the value of a loss function (which may also be referred to as a cost function), which is a function that maps an event or values of one or more variables values (e.g., real numbers) representing some cost associated with the event or values. Via the training, the training module 140 modifies the learnable parameters $\theta$ 132 of the neural network module $f_\theta$ 130 based on or minimizing the loss 170 (the value of the loss function). This optimization of the loss function (which may be convergent toward a minimum) is performed by back-propagation of so called "loss gradients", which are obtained by the training module 104 from partial derivatives of the loss function with respect to the learnable parameters $\theta$ 132 of the neural network module $f_\theta$ 130. These loss gradients are back-propagated by the training module 104 to the respective learnable parameters $\theta$ 132 in that they are used to modify (or adapt or update) the learnable parameters $\theta$ 132 of the neural network $f_\theta$ 130 to produce a lower loss 170 at the next iteration of the training phase.

At the next iteration, the neural network module 130 generates modified local feature maps $F_1$ 140 and $F_2$ 150 which include grids of modified local image descriptors for the images $I_1$ and $I_2$, respectively, where the feature maps and thereby the local feature descriptors are determined by the neural network module 130 using the modified learnable parameters $\theta$ 132. These modified local feature descriptors are better suited for identifying corresponding portions in images of an image pair, leading to a lower loss 170 and to a smaller adaptation of the learnable parameters $\theta$ 132 at the next back-propagation of the loss gradients, until the loss function converges towards a minimum value of the loss 170 and no further adaptation/modification of the learnable parameters 132 is necessary. Once the loss function has converged (on the minimum), neural network module 130 may be said to be trained, and it can then be applied to image pairs for identifying corresponding portions in the images of the image pair.

Figure 2:
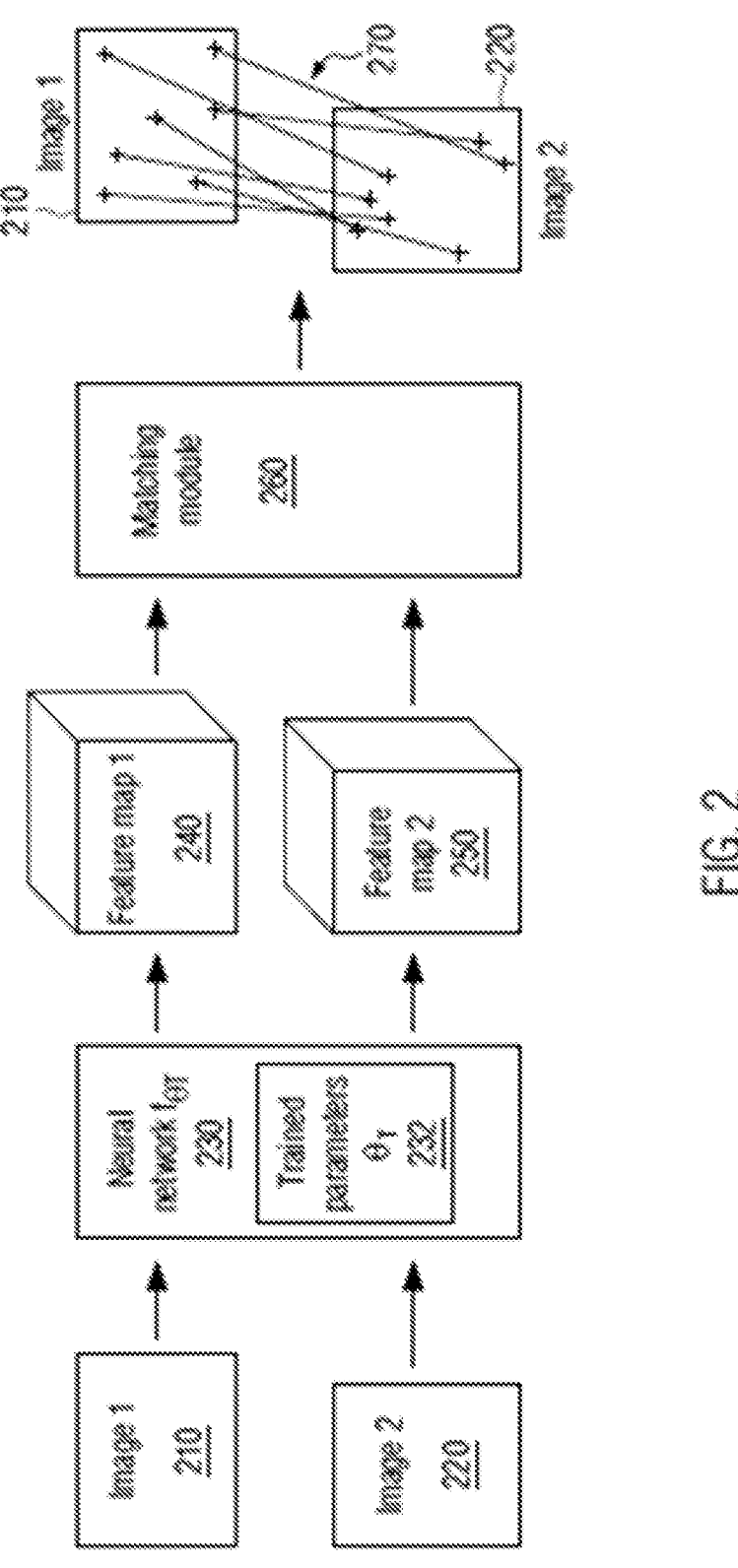
FIG. 2 illustrates a procedure for determining correspondences between images of an image pair by applying a trained neural network module to the images.

FIG. 2 illustrates a functional block diagram of a system that performs a process of determining corresponding portions of images of an image pair. A trained neutral network module $f_{\theta_T}$ 230 with a plurality of internal parameters $\theta_T$ may be the result of a training phase as described with reference to FIG. 1 (the neural network module 130 after the training). The trained neural network module 230 is receives images 210 and 220 and generates feature map 240 for image 210 and feature map 250 for image 220. The process of applying the trained neural network 230 to an image and generating a feature map for the image is equivalent to the respective process in the training phase as described with reference to FIG. 1. Accordingly, generated feature maps 240 and 250 each include a grid of local image descriptors including a plurality of individual PUMP descriptors corresponding to individual pixels of the image from which the feature map has been generated.

Feature maps 240 and 250 are subsequently provided to matching module 260, which is configured to extract correspondences 270 between portions of image 210 and image 220 based on the PUMP descriptors of feature maps 240 and 250. Each correspondence 270 maps a portion (e.g. a pixel or a patch/group of pixels) of image 210 to a portion (e.g. a pixel or a patch) of image 220. A correspondence defines a true match if the corresponding portions of images 210 and 220 depict the same feature (e.g., object) of the depicted scene.

Matching module 260 may determine the correspondences 270 for images 210 and 220, for example, using the DeepMatching algorithm described in Revaud et al., Hierarchical deformable dense matching, IJCV, 2016 to feature maps 240 and 250 to extract dense or quasi-dense correspondences 270 between portions of images 210 and 220, which is incorporated herein in its entirety. The DeepMatching algorithm may be adapted and used herein replacing the basic descriptors of the DeepMatching algorithm with the PUMP descriptors of feature maps 240 and 250. While the DeepMatching algorithm example is provided, the present application is also applicable to other ways of determining the correspondences. In examples where quasi-dense correspondence extraction one of images 210 and 220 is split in atomic patches (e.g. in non-overlapping 4×4 pixel patches), one correspondence 270 is output for each atomic patch.

In various implementations, matching module 260 may apply a sparse keypoint-based matching technique/algorithm to feature maps 240 and 250 to extract correspondences 270 between keypoints of images 210 and 220. Examples of sparse keypoint-based matching techniques include SIFT (Lowe, "Object recognition from local scale invariant features", ICCV, 1999), ORB (Rublee et al., "ORB: an efficient alternative to SIFT or SURF", ICCV, 2011), R2D2 (Revaud et al., "R2D2: repeatable and reliable detector and descriptor", NeurIPS, 2019), or SuperPoint (DeTone et al., "Self-supervised interest point detection and description", CVPR Workshops, 2018), which are each incorporated herein in its entirety. Regardless of the specific technique/algorithm applied to extract correspondences between images 210 and 220, the applied technique is adapted to the present invention by replacing the basic descriptor of the respective technique with the PUMP descriptors of feature maps 240 and 250. The matching module 260 outputs an indicator of whether a true match exists between portions of images. For example only, the matching module 260 may display a visual indicator on a display and/or output an audible indicator via a speaker, the visual and/or audible indicator indicating whether a true match exists.

The performance of the correspondence extraction as well as the quality of the determined correspondences may depend on the PUMP descriptors, which result from applying trained neural network 230 to images 210 and 220. Since the training of the neural network module 130 is performed by back-propagation based on loss 170, the outcome of the training phase, namely the trained neural network module 230 and by extension the PUMP descriptors, depend on the specific method of determining the loss 170 and in particular on the steps performed by correlation module 160 to determine the loss 170.

Figure 3:
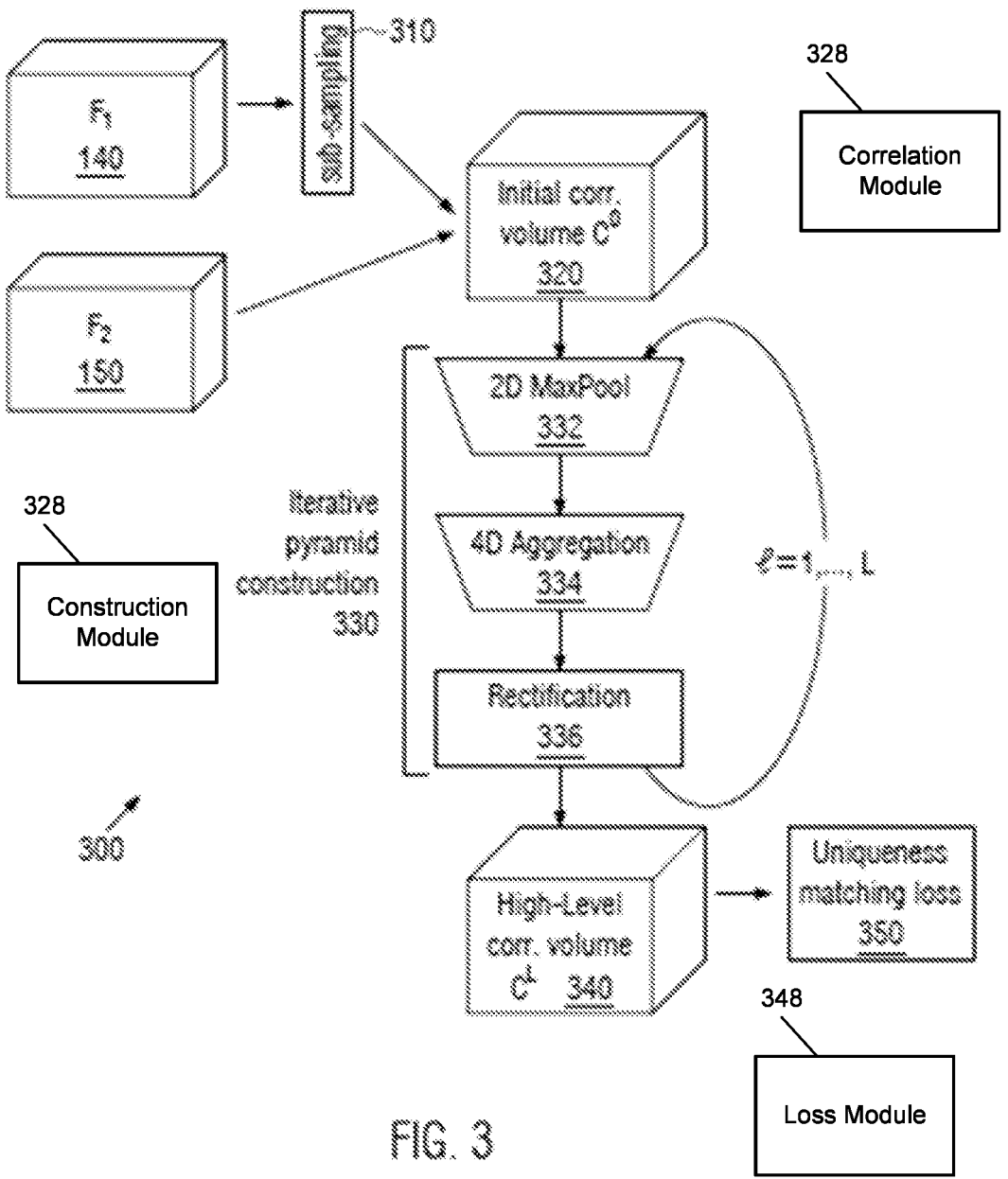
FIG. 3 illustrates the correlation module of FIG. 1.

FIG. 3 is a functional block diagram of an example implementation of the correlation module 300 for determining a loss during the training phase for neural network 130. Correlation module 300 may be an example of correlation module 160 as described with reference to FIG. 1. Correlation module 300 receives feature maps $F_1$ 140 and $F_2$ 150, which result from respectively applying the neural network module 130 to images $I_1$ and $I_2$, as has been previously described with reference to FIG. 1.

In a first optional step, feature map $F_1$ 140 may be sub-sampled 310. Sub-sampling 310 may refer to reducing the size of feature map $F_1$ 140 by replacing a plurality of entries of feature map 140 by only a single value. For example, the grid of local image descriptors 142 of feature map 140 may be partitioned in non-overlapping rectangular atomic portions with a height of n entries (e.g., n=2, 3, 4, 5, 6, . . . ) and a width of m entries (e.g., m=2, 3, 4, 5, 6, . . . ). In some embodiments the rectangular portions are quadratic with n=m, in a specific example n=m=4. Each portion includes n×m local image descriptors each of which is described as a d-dimensional vector. Sub-sampling 310 replaces the n×m local image descriptors of each atomic portion by a single local image descriptor for the atomic portion. This is achieved by choosing a single value for each entry of the d-dimensional vector based on the n×m values of the respective entries in the original local image descriptors of an atomic portion. The subsampling module 310 may choose a single value from the n×m original values in a suitable manner. In an example, the maximum value of the respective n×m original values is chosen by the subsampling module 310 for each entry of the resulting d-dimensional vector of the local image descriptor. In another example, the average value of the respective n×m original values is selected by the subsampling module 310 for each entry of the resulting d-dimensional vector of the local image descriptor. In an example, the vector values of a local image descriptor at a specific position within each portion are chosen by the subsampling module 310 to replace the respective n×m original values. Regardless of the way of choosing the single local image descriptor for each portion, sub-sampling the feature map $F_1$ 140 generates a reduced feature map $F_1'$ including a reduced grid of local image descriptors, the reduced grid of local image descriptors having dimensions $H_1' \times W_1'$, where $H_1' = H_1/n$ and $W_1' = W_1/m$.

In a next step an initial 4D (four dimensional) correlation volume $C^0$ may be determined by a volume module 320 based on feature maps $F_1$ 140 and $F_2$ 150. In the example of feature map $F_1$ 140 having been sub-sampled to generate reduced feature map $F_1'$, the initial 4D correlation volume $C^0$ may be determined by the volume module 320 based on reduced feature map $F_1'$ and feature map $F_2$ 150. Each entry in $C^0$ may represent a correlation between a pixel 114 $p=(x_p, y_p)$ in pixel grid 112 of image 110 and a pixel 124 $q=(x_q, y_q)$ in pixel grid 122 of image 120. The correlation may be denoted as $C_{p,q}$. In case feature map $F_1$ 140 has been sub-sampled to generate reduced feature map $F_1'$, each value in initial 4D correlation volume $C^0$ 320 may represent a correlation between an atomic portion (or patch) of the pixel grid 112 of image 110 with center $p=(x_p, y_p)$ and a pixel $q=(x_q, y_q)$ in pixel grid 122 of image 120. This correlation may similarly be denoted as Cm. For the sake of clarity in the following description below, reference will only be made to p as a pixel 114 in pixel grid 112 of image 110. However, it is to be understood that, in case of feature map $F_1$ 140 having been sub-sampled to generate reduced feature map $F_1'$, $p=(x_p, y_p)$ may refer to the center of an atomic portion (or patch) of the pixel grid 112 of image 110. Each pixel 114 (or portion) p in pixel grid 112 corresponds to a local feature descriptor 144 D(p) in the grid of local feature descriptors 142 of feature map $F_1$ 140 (or the respective reduced grid of local feature descriptors of reduced feature map $F_1'$). Similarly, each pixel 124 q in pixel grid 122 corresponds to a local feature descriptor 154 D(q) in the grid of local feature descriptors 152 of feature map $F_2$ 150. Initial correlation volume $C^0$ 320 includes all possible pixel-pixel correlation values $C^0(p, q)$. The correlation value $C^0(p, q)$ may be determined (e.g., by a correlation module 318) by calculating a similarity value based on D(p) and D(q), such as using the equation:

$$C^0(p,q)=sim(D(p),D(q)) \tag{1}$$

Each similarity value may be a real number representing a measure of similarity between the local image descriptors on D(p) and D(q). A suitable method for calculating similarity values for a pair of local image descriptors may be used. In an example, each similarity value is determined by the correlation module as a cosine similarity between the local image descriptors of a pair of local image descriptors on D(p) and D(q) based on the scalar product between the respective d-dimensional vectors representing the local image descriptors. In an example, each value $C^0(p,q)$ is a number in the range between 0 and 1. Initial correlation volume $C^0$ 320 may have dimensions $H_1 \times W_1 \times H_2 \times W_2$. In the case where feature map $F_1$ 140 has been sub-sampled to generate reduced feature map $F_1'$, initial correlation volume $C^0$ 320 may have dimensions $H_1' \times W_1' \times H_2 \times W_2$.

Once initial correlation volume $C^0$ 320 has been determined, iterative pyramid construction 330 is performed by a construction module 328 based on the initial correlation volume $C^0$ to generate a high-level correlation volume $C^L$ 340. Iterative pyramid construction 330 includes 4D aggregation 334 for iteratively determining higher-level correlation volumes $C^\ell$ for $1 \le \ell \le L$. In a first iteration portion, first-level correlation volume $C^1$ is determined by the construction module 328. First-level correlation volume $C^1$ includes correlation values $C^1(p,q)$, which represent correlations between first-level patches of pixel grid 112 and pixel grid 122. Generally, a patch may be a rectangular portion of a pixel grid (e.g. pixel grid 112 or pixel grid 122). For ease of discussion, the following is described with patches of width and height 2 (denoted as patch size 2×2), including either 2×2 pixels of a pixel grid or 2×2 patches of the previous iteration. However, the specific patch size is not to be construed as limiting, and the present application is applicable to other patch sizes (e.g. 2×3, 3×2, 3×3, or 4×4). The center of a patch of pixel grid 112 is denoted as $p=(x_p, y_p)$, and the center of a patch of pixel grid 122 is denoted as $q=(x_q, y_q)$. For a consistent notation, 0-level patches are considered to be pixels of the respective pixel grids. With this notation, an $\ell$-level patch has 2×2 children patches of level $\ell-1$ for $1 \le \ell \le L$. A vector from the center of an We-level patch to the $i^{th}$ ($\ell-1$)-level child patch of the $\ell$-level patch is denoted $v_i^{\ell-1}$, for i=0, . . . , 3. In an example, the respective vectors are $v_0^{\ell-1}=(2^{\ell-1}, 2^{\ell-1})$, $v_1^{\ell-1}=(2^{\ell-1}, -2^{\ell-1})$, $v_2^{\ell-1}=(-2^{\ell-1}, 2^{\ell-1})$ and $v_3^{\ell-1}=(-2^{\ell-1}, -2^{\ell-1})$. The correlation between $\ell$-level patches is determined by the construction module 328 based on the pair-wise correlations between the ($\ell-1$)-level patches of which the $\ell$-level patches are comprised. Specifically, $C^\ell(p,q)$ may be determined by the construction module 328 as the average correlation of its four ($\ell-1$)-level child patches in $C^{\ell-1}$:

$$C^\ell(p,q) = \frac{1}{4}\left(C^{\ell-1}\left(p+v_0^{\ell-1}, q+v_0^{\ell-1}\right) + C^{\ell-1}\left(p+v_1^{\ell-1}, q-v_1^{\ell-1}\right) + \right.$$
$$\left. C^{\ell-1}\left(p-v_2^{\ell-1}, q+v_2^{\ell-1}\right) + C^{\ell-1}\left(p+v_3^{\ell-1}, q+v_3^{\ell-1}\right)\right) \tag{2}$$

Aggregation 334 can be performed by the construction module 328 using 4D convolutions with a fixed sparse kernel, where non-zero values encode the parent-children relations in the pyramid. So far, this formulation is able to handle rigid transformations, where all child patches strictly fit into the boundaries of the parent patch. Some example include an extension of the aggregation, which allows for a predetermined degree of local deformations. In these examples, small local deformations of child patches may be taken into account at each iteration level by an additional 2D max-pooling step 332 performed by the construction module 328 before 4D aggregation 334 in each iteration cycle. The 2D max-pooling may be performed with a suitable kernel (e.g. of size 3×3) along both dimensions of pixel grid 122 of the second Image $I_2$ 120.

In an example, deformations may be taken into account by adapting aggregation 334, such that the aggregation aggregates the highest correlation of each of the child ($\ell-1$)-level patches at position $p_i^{\ell-1}$ (with $p_0^{\ell-1}$=p+$v_0^{\ell-1}$, $p_1^{\ell-1}$=p+$v_1^{\ell-1}$, $p_2^{\ell-1}$=p-$v_2^{\ell-1}$, and $p_3^{\ell-1}$=p+$v_3^{\ell-1}$) with ($\ell-1$)-level patches at positions in a neighborhood centered at position of $q_i^{\ell-1}$ (with $q_0^{\ell-1}$=q+$v_0^{\ell-1}$, $q_1^{\ell-1}$=q+$v_1^{\ell-1}$, $q_2^{\ell-1}$=q-$v_2^{\ell-1}$, and $q_3^{\ell-1}$=q+$v_3^{\ell-1}$). These maximal correlations may then be chosen for determining the correlations in $C^\ell$:

$$C^\ell(p,q) = \frac{1}{4}\sum_{i=0}^3 \max_{q' \in \Omega_i} C^{\ell-1}\left(p_i^{\ell-1}, q'\right) \tag{3}$$

Here, $\Omega_i$ denotes a small local neighborhood centered at $q_i^{\ell-1}$.

In an example, deformations may also be taken into account by averaging over correlations of the ($\ell-1$)-level patch at position $p_i^{\ell-1}$ with ($\ell-1$)-level patches at positions in the neighborhood $\Omega_i$ centered at position $q_i^{\ell-1}$:

$$C^\ell(p,q) = \frac{1}{4}\sum_{i=0}^3 \frac{1}{|\Omega_i|}\sum_{q' \in \Omega_i} C^{\ell-1}\left(p_i^{\ell-1}, q'\right) \tag{4}$$

The number of ($\ell-1$)-level patches in the neighborhood $\Omega_i$ of $q_i^{\ell-1}$ is denoted $|\Omega_i|$. In an example, the width and the height of the neighborhood $\Omega_i$ is a predetermined fraction $$\left(\text{e.g. } \frac{1}{4}, \frac{1}{2}, 1\right)$$

of the width and the height of the child ($\ell-1$)-level patches.

In each iteration, rectification 336 can optionally be performed by the construction module 328 to strengthen consistent correlations and discard spurious ones. Rectification 336 may be implemented as a power non-linearity $x \rightarrow \max(0, x^\gamma)$ applied at the end of each iteration to the output correlation values of the 4D aggregation 334. The specific value of $\gamma$ can be adapted to the circumstances and is not to be construed as limiting for the present invention. In an example, $\gamma$=1.5.

Figure 4:
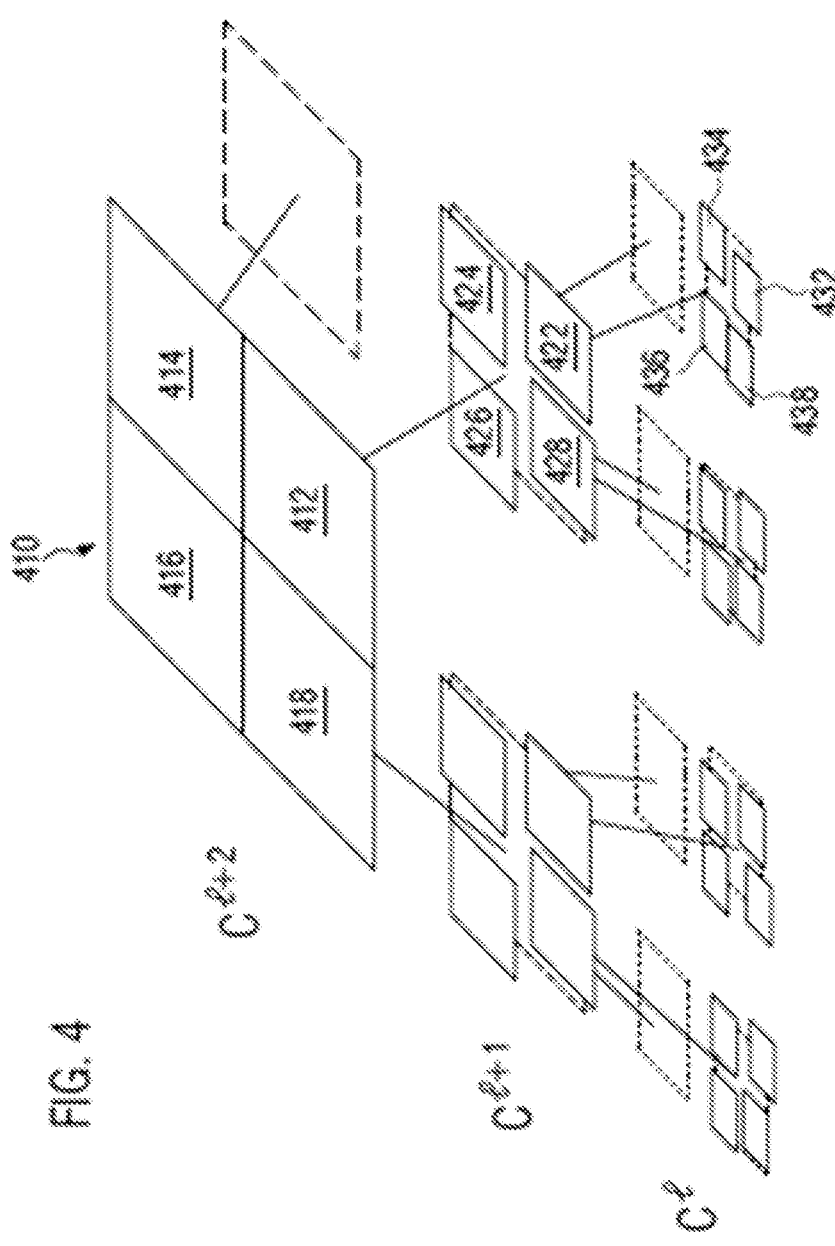
FIG. 4 illustrates the construction of higher-level image patches from lower-level image patches in the iterative pyramid construction of FIG. 3.

Mathematically, the receptive field of a parent patch doubles along x- and y-dimensions at each pyramid level, hence rapidly reaching the size of the full image, at which point the aggregation process naturally ends. FIG. 4 illustrates the deformable pyramidal structure, which is enforced by iterative pyramid construction 330. FIG. 4 shows patches at three levels of iterative pyramid construction 330. At level $\ell+2$ (the top level in FIG. 4), four neighboring (e+2)-level patches 412, 414, 416 and 418 are shown. A correlation in the parent level correlation volume $C^{\ell+2}$ aggregates four correlations of the child level with a small tolerance for deformations, and so on for all levels. An ($\ell+2$)-level correlation for ($\ell+2$)-level patch 412 is aggregated from ($\ell+1$)-level correlations for ($\ell+1$)-level patches 422, 424, 426 and 428. Similarly, an ($\ell+1$)-level correlation for ($\ell+1$)-level patch 422 is aggregated from $\ell$-level correlations for $\ell$-level patches 432, 434, 436 and 438.

Returning to FIG. 3, the output of the iterative pyramid construction applied to $C^0$ 320 is a consolidated high-level correlation volume $C^L$ 340. The third and fourth dimensions of $C^L$ 340, which correspond to the dimensions of the pixel grid 122 of $I_2$ 120, are reduced by a factor $2^L$, where L is the number of iterations (or pyramid levels) of iterative pyramid construction 330. The reduction factor may be different for other choices of the patch size in iterative pyramidal construction 330 and is not to be construed as limiting. In embodiment $C^L$ 340 may have dimensions $H_1 \times W_1 \times H_2 \times W_2$. If optional sub-sampling step 310 is performed, $C^L$ 340 may have dimensions $H_1' \times W_1' \times H_2 \times W_2$.

The consolidated high-level correlation volume $C^L$ represents the correlations between large deformable high-level patches. A high-level patch centered at pixel p may have a unique match in image 12. In other words, there may exist only one q such that $C^L(p, q)$ has a high value, while all other correlations for $q' \neq q$ may be close to 0. While this constraint may not be realistic for pixel-level descriptors due to repetitive patterns, plain regions without structure, or severe appearance changes, it may be a natural property for high-level patches in $C^L$ 340. The larger a patch is, the easier it may be to resolve ambiguities and hard correspondences due to the larger context.

Based on these considerations, uniqueness matching loss 350 is determined by a loss module 348 based on $C^L$ 340 that encourages the property of a unique match for every high-level patch. Uniqueness matching loss 350 is the output value of correlation module 300 and represents an embodiment of loss 170 as illustrated in FIG. 1. Since each high-level patch is dynamically built at test-time upon a deformable subset of pixel-level correlations, this loss is automatically back-propagated to optimal pixel correlations fitting iterative pyramid construction 330, and hence to pixel level local image descriptors.

The following presents an example implementation of uniqueness matching loss 350. Other implementations are within the scope of the present application as long as the resulting loss rewards the uniqueness of matches between high-level patches in $C^L$ such that a high-level patch in $I_1$ 110 has only one matching high-level patch in $I_2$ 120. For discussion, the example implementation of uniqueness matching loss 350, $C^L$ may be formally reshaped as a 2-dimensional tensor of size $$(W_1 H_1) \times \left( \frac{W_2 H_2}{4^L} \right)$$

(or in case sub-sampling step 310 is performed of size $$(W_1' H_1') \times \left( \frac{W_2 H_2}{4^L} \right)).$$

The correlation volume $C^L$ 340 may be normalized such that every row sums to 1:

$$\bar{C}^L(p, q) = \frac{C^L(p, q)}{\sum_q C^L(p, q) + \varepsilon}, \tag{5}$$

where $\varepsilon$ serves as a regularization term that deals with occluded areas, for which all correlations would be close to zero. The value of $\varepsilon$ can be set for the circumstances and should not be considered limiting. In an example, the value of $\varepsilon$ is 0.03. The uniqueness loss can then be expressed as:

$$\mathcal{L}_u(F_1, F_2) = -\frac{1}{H_1 \times W_1} \|\bar{C}^L\|_2^2. \tag{6}$$

The expression $H_1 \times W_1$ in equation (5) is replaced by $H_1' \times W_1'$ in case optional sub-sampling step 310 is performed to generate reduced feature map $F_1'$. Given that $\bar{C}^L$ is $\ell_1$-normalized, the uniqueness loss concretely encourages all values in $\bar{C}^L$ to be close to 0 except one per row (i.e. one per high-level patch) that will be close to 1.

In an example, the asymmetric loss $\mathcal{L}u(F_1, F_2)$ is averaged for each image pair in both directions: $\mathcal{L}_u' = \mathcal{L}_u(F_1, F_2) + \mathcal{L}_u(F_2, F_1)$. The computational cost and memory footprint may be reduced in various implementations by additionally sub-sampling feature maps $F_1$ and $F_2$ by a predetermined factor (e.g. by a factor 2) before passing them to correlation module 300. In an example, the model is trained with batches of image pairs (e.g. 10 image pairs, 12 image pairs, 16 image pairs, or 24 image pairs). A portion of the image pairs of the batch (e.g., half of the image pairs, ⅔ of the image pairs, a quarter or three quarters of the image pairs) are trained with unsupervised loss 350 (e.g. $\mathcal{L}_u(F_1, F_2)$ or $\mathcal{L}_u'$).

An averaged unsupervised loss $\overline{\mathcal{L}_u}$ may be calculated over all image pairs of the portion of the batch of image pairs. The remaining portion of the batch of image pairs may be generated synthetically via standard data augmentation of single images in a self-supervised manner. For these latter pairs, for which dense ground-truth correspondences are obtained from the augmentation, a pixel-wise ranking loss $\mathcal{L}_P$ (e.g., average precision loss $\mathcal{L}_{AP}$) may be used, which is based on the extracted feature maps for each image in an image pair and the known ground-truth correspondences. An average loss $\overline{\mathcal{L}_P}$ may be determined over all image pairs of the remaining portion of the batch of image pairs. The final loss L may be calculated as a weighted sum of the averaged losses. In an example, L is calculated as $\overline{\mathcal{L}_{AP}} + 0.3 \overline{\mathcal{L}_u'}$. A predetermined number of training iterations (e.g. 50000) are performed in order to achieve convergence for $f_\theta$. In some embodiments, the fixed learning rate of $10^{-4}$ and a weight decay of $5.10^{-4}$ is used for performing the training, although the present application is also applicable to other learning rates and weight decays.

FIG. 5 is a flowchart illustrating a computer-implemented method 500 of unsupervised training of the neural network module for learning of local image descriptors. The method is implemented as a training phase for a neural network (e.g. neural network 130) as illustrated in FIGS. 1 and 3. The method starts at 510, at which a pair of training images is obtained. Obtaining the training images encompasses that they can be received from any memory location (e.g., a local or remote computing system, a local or remote database, a cloud storage or any other memory location known in the field) on which they are stored. Alternatively, the images may be automatically retrieved from memory locations. The images of the obtained image pair depict a same scene or visual content (e.g. a same object, a same person, a same architectural structure, and/or a same natural structure) such that both images include corresponding portions related to same features of the depicted scene. No dense or sparse ground-truth correspondences are known for the images of the image pair in advance of the training phase. The obtained image pair includes a first image (e.g. image 110) with a first pixel grid (e.g. pixel grid 112) and a second image (e.g. image 120) with a second pixel grid (e.g. pixel grid 122). The pixel grids differ in at least one aspect. The first pixel grid may have different horizontal and/or vertical dimensions different from those of the second pixel grid. Additionally or alternatively, the pixel values of at least a portion of the pixels in the first pixel grid may differ from pixel values of the respective pixels in the second pixel grid.

At 520 the neural network module receives to the first image and generates a feature map $F_1$ (e.g., feature map 140) based on the first image. Additionally, the neural network module receives the second image and generates a feature map $F_2$ (e.g., feature map 150) based on the second image. The neural network module has an initial set of internal, learnable parameters (e.g., parameters 132). Feature map $F_1$ includes a first grid of local descriptors (e.g., grid of local descriptors 142), where each local descriptor (e.g., local descriptor 144) in the first grid of local descriptors corresponds to a pixel within the first pixel grid. Each local descriptor of the first grid of local descriptors is a computer-processable description of the local environment of the corresponding pixel in the first pixel grid. Feature map $F_2$ includes a second grid of local descriptors (e.g., grid of local descriptors 152), where each local descriptor (e.g., local descriptor 154) in the second grid of local descriptors corresponds to a pixel within the second pixel grid. Each local descriptor of the second grid of local descriptors is a computer-processable description of the local environment of the corresponding pixel in the second pixel grid. A local image descriptor may be represented as a d-dimensional vector and is extracted from a pixel grid through the application of the neural network on the respective image.

At 530 an initial correlation volume $C^0$ (e.g. initial correlation volume 320) is determined by the correlation module 328 based on $F_1$ and $F_2$. Initial correlation volume $C^0$ includes local correlations of pixels of the first pixel grid with pixels of the second pixel grid. Each local correlation is determined for a pixel of the first pixel grid and a pixel of the second pixel grid based on a first corresponding local image descriptor in the and first grid of local image descriptors and a second corresponding local image descriptor in the second grid of local image descriptors. The first corresponding local image descriptor corresponds to the pixel in the first pixel grid and the second corresponding local image descriptor corresponds to the pixel in the second pixel grid. In an example, the correlation $C^0(p, q)$ between a pixel p of the first pixel grid and a pixel q of the second pixel grid is determined as a similarity between local image descriptors $D(p)$ and $D(q)$. $D(p)$ corresponds to p and is comprised in the first grid of local image descriptors. $D(q)$ corresponds to q and is in comprised the second grid of local image descriptors. The similarity between local image descriptors $D(p)$ and $D(q)$ may be determined as a cosine similarity based on the scalar product of the d-dimensional vectors representing $D(p)$ and $D(q)$.

At 540, a high-level correlation volume $C^L$ (e.g. high-level correlation volume 340) is determined by the construction module 328 based on $C^0$ by iterative pyramid construction (e.g., iterative pyramid construction 330). High-level correlation volume $C^L$ includes aggregated high-level correlations between iteratively constructed high-level patches of the first and second pixel grids. Each high-level patch of the first pixel grid may be a rectangular portion of the first pixel grid. Each high-level patch of the second pixel grid may be a rectangular portion of the second pixel grid. $C^L$ may be iteratively constructed starting from $C^0$. A first iteration portion may include aggregating local correlations of $C^0$ to first-level correlations between first-level patches of the first pixel grid and first-level patches of the second pixel grid, thereby generating a first-level correlation volume $C^1$. The first-level correlation between a first-level patch of the first pixel grid and a first-level patch of the second pixel grid may be determined as an averaged sum of local correlations between corresponding pixels in the first-level patch of the first pixel grid and the first-level patch of the second pixel grid. Each of the local correlations in the averaged sum of local correlations may have a maximum correlation value among a plurality of neighboring local correlation values.

A subsequent $(n+1)$th iteration portion for $1 \leq n < L$, may include generating an $(n+1)$-level correlation volume $C^{n+1}$ by aggregating n-level correlations of $C^n$ to $(n+1)$-level correlations between $(n+1)$-level patches of the first pixel grid and $(n+1)$-level patches of the second pixel grid. The $(n+1)$-level patches may include neighboring n-level patches of the respective pixel grid. The aggregated n-level correlations correspond to the neighboring n-level patches of the correlated $(n+1)$-level patches. The $(n+1)$-level correlation between an $(n+1)$-level patch of the first pixel grid and an $(n+1)$-level patch of the second pixel grid may be determined as an averaged sum of n-level correlations between corresponding n-level patches of the $(n+1)$-level patch of the first pixel grid and the $(n+1)$-level patch of the second pixel grid. Each of the n-level correlations in the averaged sum of n-level correlations may have a maximum correlation value among a plurality of neighboring n-level correlation values.

At 550, a uniqueness matching loss (e.g., uniqueness matching loss 350) is determined by the loss module 348 for $F_1$ and $F_2$ based on $C^L$. The uniqueness matching loss provides a measure for a deviation of $F_1$ and $F_2$ from optimal feature maps. The uniqueness matching loss is configured to indicate a low deviation to optimal feature maps if, based on the high-level correlations in $C^L$, each high-level patch of the first pixel grid has a unique (i.e. only one) match among the high-level patches of the second pixel grid and each high-level patch of the second pixel grid has a unique (i.e. only one) match among the high-level patches of the first pixel grid. Accordingly, the uniqueness matching loss has low values if for each high-level patch of the first and the second pixel grids only one high-level correlation in $C^L$ corresponding to the respective patch has a high correlation value and all other high-level correlations in $C^L$ corresponding to the respective high-level patch have a low correlation value. A high correlation value may be close to 1, whereas a low correlation value may be close to 0.

At 560, the neural network module is trained by minimizing a loss function based on the uniqueness matching loss to generate an optimized set of the parameters of the neural network module. Minimizing the loss function may include performing backpropagation based on the loss function to determine a new set of parameters which achieves a lower uniqueness matching loss in a subsequent training iteration. Training the neural network module may further include repeating the method with the optimized set of parameters for a predetermined number of times or until the optimized set of parameters converges, thereby generating a trained neural network module configured to determine local image descriptors.

FIG. 6 is a flowchart illustrating an example computer-implemented method 600 of determining corresponding portions in images with a trained neural network module, where the neural network module has been trained according to the example of FIG. 5. The method starts at 610 where the trained neural network module receives a first new image (e.g., image 210) and generates a first feature map (e.g., feature map 240) including a first grid of local image descriptors based on the first image.

At 620 the trained neural network module receives a second new image (e.g., image 220) and generates a second feature map (e.g., feature map 250) including a second grid of local image descriptors based on the second image. The first and second new images may depict a same scene using different pixel grids.

At 630 a correspondence (e.g. one of correspondences 270) between a portion of the first new image and a portion of the second new image is identified based on the first and second grids of local image descriptors. The corresponding portions identified relate to a same part of the depicted scene. Additional correspondences between the images may be determined either between keypoints of the images or for each pixel in the images (i.e. dense correspondences). 630 may be performed by matching module 260 shown in FIG. 2.

First, details of an example implementation of the presented training method as used for a set of experiments will be discussed. Then, different datasets and benchmarks used in the experiments will be discussed. Finally, the details of the experiments and comparisons to other techniques will be presented.

As training data, 150,000 pairs may be used from the SfM-120k dataset, which contains images from famous landmarks. These training pairs are obtained using the overlap of observations in a SfM model built with COLMAP and provided with the dataset. This process is done with SIFT, which requires no supervision, and only serves to verify whether two images depict the same scene, but does not guide the matching at all. Random crops of size 256×256 are performed on these pairs. To generate the synthetic pairs, images randomly sampled from this dataset and standard data augmentation techniques are applied. In particular, random pixel and color jittering, random rescaling, rotations and homographies are used.

In an example implementation of network $f_\theta$, gradients with a 5×5 convolution with stride 1 and 128 output channels may first be extracted. Then 4×4 non-overlapping gradient patches are embedded into 512-dimensional features using a convolution of kernel 4×4 with stride 4. Subsequently, a series of pointwise and depthwise convolutions are applied. The exemplary implementations uses seven such blocks, with depthwise convolutions using 9×9 kernels. Finally, a last pointwise convolution and PixelShuffle operation is applied to obtain a feature map F with d=128 dimensions.

The HPatches dataset includes 116 image sequences with varying photometric and viewpoint changes. Each sequence contains a reference image and five source images related by a homography to the source image taken under different viewpoint or illumination.

The ETH3D dataset includes indoor and outdoor sequences captured using a hand-held camera and registered with SfM. Image pairs are generated by sampling frames with a fixed interval. It is used to evaluate the robustness to viewpoint changes as the baseline widens for increasing intervals.

Aachen Day-Night v1.1 is a large-scale outdoor visual localization benchmark. The Day-Night split is specifically considered to measure the generalization performance of the embodiments of the present invention, as it features large viewpoint changes and severe illumination changes due to the day/night duality. For this task, the following method is used: in a first portion, a global SfM map is built from the database images, and in a second portion, query images are localized with regard to this mapping. The computational complexity of a complete matching is handled via the use of image retrieval with AP-GeMLM18 global descriptors. The number of image pairs is reduced to the top-20 nearest neighbors, during both the mapping and the query phases. Finally, 20,000 local features for each of these retrieved images are extracted and matched to estimate first the global map and then the camera poses.

Regarding dense matching, the performance of the PUMP descriptors (the local image descriptors extracted from an image by applying trained neural network module 230 to the image), according to examples, is evaluated in a dense or quasi-dense manner using the DeepMatching algorithm. In this example implementation of matching module 260, the basic pixel descriptor of the DeepMatching algorithm is replaced by the PUMP descriptors. The rest of the pipeline is left unchanged, except for the built-in cycle-consistency verification that may be enhanced to include nearest neighbors as well. The output of the DeepMatching algorithm may not be dense but quasi-dense, as it outputs one correspondence per atomic patch from the first image. When dense warp fields are required, a densification technique is used, such as following COTR's scheme, which is described in Jiang et al., Cotr: Correspondence transformer for matching across images, ICCV, 2021, which is incorporated herein in its entirety and includes linearly interpolated matches using a Delaunay triangulation.

For the HPatches dataset, evaluation is performed on all image pairs from image data set that features viewpoint changes. Table 1 below represents both quasi-dense and fully-dense (i.e., interpolated) outputs. Two models according to examples of the present application are evaluated: one trained solely from self-supervised pairs (S), i.e., obtained via data augmentation, and one including self-supervised pairs and unsupervised pairs (S+U).

Without interpolation, the self-supervised model (S) may perform slightly better than the model trained with unsupervised pairs (S+U). This may be given that it is trained exclusively from synthetic augmentations (homographies) fitting exactly the distribution of the test set. In fully-dense mode, the unsupervised model (S+U) may outperform the self-supervised model (S), indicating that the unsupervised loss may allow for production of fewer outliers (as these strongly impair Delaunay interpolation) and is thus more robust. Overall, whether it be used with or without interpolation, both models may outperform other approaches by a large margin. Both models according to examples of the present application also significantly outperform the recently proposed unsupervised WarpC matching loss, described in Truong et al., Warp consistency of unsupervised learning of dense correspondences, ICCV, 2021. The results highlight the excellent capacity of the pyramidal matching prior in the case of large planar areas without discontinuities.

matching setting may be evaluated by comparing again the performance achieved by the example PUMP (S) and PUMP (S+U) models described herein. Since the models of the present application produce dense descriptor maps, an external keypoint detector may be used to select repeatable

TABLE 1

Average End Point Error (AEPE) and Percent of Correct Keypoints (PCK) for different thresholds on the HPatches dataset. Sparse methods only return a subset of correspondences which they are confident of. The best and second best results are respectively in bold and underlined. DM stands for DeepMatching and 'Interp.' means Interpolation. The examples of the present application are evaluated only with self-supervised pairs (S) and with a combination of self-supervised and unsupervised training pairs (S + U).

|  | Method | AEPE↓ | PCK@1↑ | PCK@3↑ | PCK@5↑ |
|---|---|---|---|---|---|
| Dense | LiteFlowNet | 118.85 | 13.91 | — | 31.64 |
| flow | PWC-Net | 96.14 | 13.14 | — | 37.14 |
|  | DGC-Net | 33.26 | 12.00 | — | 58.06 |
|  | RAFT | 44.3 | 31.22 | 62.48 | 70.85 |
|  | GLU-Net | 25.05 | 39.55 | 71.52 | 78.54 |
|  | GLU-Net + GOCor | 20.16 | 41.55 | — | 81.43 |
|  | WarpC | 21.00 | — | — | 83.24 |
|  | COTR + Interp. | 7.89 | 33.08 | 77.09 | 86.33 |
|  | DMP | 5.21 | — | — | 90.89 |
|  | PUMP (S) + DM + Interp. | 4.19 | 76.36 | 90.11 | 92.29 |
|  | PUMP (S + U) + DM + Interp. | 3.76 | 77.05 | 90.86 | 93.02 |
| Sparse | COTR | 7.75 | 40.91 | 82.37 | 91.10 |
|  | PUMP (S) + DM | 2.87 | 74.72 | 96.05 | 97.14 |
|  | PUMP (S + U) + DM | 2.97 | 74.01 | 95.86 | 97.27 |

Examples of the present application may be evaluated in a more challenging setting with real image pairs from ETH3D featuring viewpoint changes on complex 3D shapes and many discontinuities in the optical flow. Since the ground-truth is sparse and not necessarily aligned with the quasi-dense output, only results with the densely-interpolated variant for various frame intervals (e.g., rate) are presented in Table 2. A model trained with unsupervised pairs may significantly outperform the self-supervised one by up to 25% (relative gain). This highlights a possible superior robustness against realistic noise of the model trained by injecting matching priors. It may also outperform other approaches, scoring the first or second Average End Point Error (AEPE) for all rate intervals. In addition, the example models according to the present application are significantly faster than other methods, some of which require multiple minutes per testing pair for specific fine-tuning on each one.

locations in the image scale-space. To make the evaluation as comprehensive as possible, the performance for three standard detectors may be measured: SIFT, R2D2, and SuperPoint. For each detector, the same number of keypoints are extracted at the same locations and scales for each example, making the evaluation fair and strictly centered on the descriptors.

A study of the overall descriptor quality may be performed by evaluating jointly on two complementary tasks, namely in terms of keypoint matching on HPatches and localization accuracy on Aachen-Night. For HPatches, the Mean Matching Accuracy (MMA) may be measured. The MMA corresponds to the average percentage of correct matches for all image pairs with regard to a specified error threshold in pixels. Visual localization performance may be measured as the percentage of queries successfully localized with regard to specified thresholds on the camera position and orientation. Table 3 presents results for each keypoint

TABLE 2

Average EndPoint Error (AEPE) for different rates on the ETH3D dataset. The best and second best results are respectively in bold and underlined.

| | AEPE↓ | | | | | | |
|---|---|---|---|---|---|---|---|
| Method | rate3 | rate5 | rate7 | rate9 | rate11 | rate13 | rate15 |
| LiteFlowNet | 1.66 | 2.58 | 6.05 | 12.95 | 29.67 | 52.41 | 74.96 |
| PWC-Net | 1.75 | 2.10 | 3.21 | 5.59 | 14.35 | 27.49 | 43.41 |
| DGC-Net | 2.49 | 3.28 | 4.18 | 5.35 | 6.78 | 9.02 | 12.23 |
| GLU-Net | 1.98 | 2.54 | 3.49 | 4.24 | 5.61 | 7.55 | 10.78 |
| RAFT | 1.92 | 2.12 | 2.33 | 2.58 | 3.90 | 8.63 | 13.74 |
| DMP | 1.78 | 2.07 | 2.52 | 3.07 | 4.72 | 6.14 | 7.47 |
| COTR + Interp. | 1.71 | 1.92 | 2.16 | 2.47 | 2.85 | 3.23 | 3.76 |
| PUMP (S) + DM + Interp. | 1.77 | 2.81 | 2.39 | 2.39 | 3.56 | 3.87 | 4.57 |
| PUMP (S + U) + DM + Interp. | 1.67 | 1.86 | 2.12 | 2.37 | 2.81 | 3.41 | 3.69 |

Regarding sparse keypoint-based matching, the impact of the matching priors leveraged during training in a sparse detector and each model on both benchmarks. The results show that the example models according to the present application, including the self-supervised model (S), significantly outperform their respective keypoint baselines on HPatches. The model trained with unsupervised pairs (S+U) may outperform the self-supervised model on average and all baseline keypoints as well, despite being trained without pixel-level supervision.

TABLE 3

Mean Matching Accuracy (MMA) on HPatches and percentage of localized queries on Aachen-Night within three error thresholds, with different sparse keypoint detectors. Absolute gain shows the performance increase when training with unsupervised pairs (S + U) compared to self-supervised pairs only (S).

| Detector | Descriptor | HPatches | | | Localization on Aachen Day-Night | | |
|---|---|---|---|---|---|---|---|
| | | MMA@1↑ | MMA@3↑ | MMA@5↑ | 0.25 m, 2° | 0.5 m, 5° | 5 m, 10° |
| SIFT | SIFT | 29.79 | 43.89 | 46.74 | 45.55 | 53.40 | 63.87 |
| | PUMP (S) | 33.81 | 55.35 | 63.26 | 67.02 | 76.96 | 90.58 |
| | PUMP (S + U) | 34.94 | 58.02 | 67.37 | 73.30 | 86.91 | 97.91 |
| | Abs. gain | ↑+1.1 | ↑+2.7 | ↑+4.1 | ↑+6.2 | ↑+10.0 | ↑+7.3 |
| R2D2 | R2D2 | 33.17 | 75.53 | 83.84 | 72.25 | 85.86 | 97.91 |
| | PUMP (S) | 37.46 | 83.38 | 91.46 | 69.63 | 84.82 | 96.86 |
| | PUMP (S + U) | 37.83 | 84.16 | 92.42 | 73.30 | 86.91 | 98.43 |
| | Abs. gain | ↑+0.4 | ↑+0.8 | ↑+1.0 | ↑+6.2 | ↑+2.1 | ↑+1.6 |
| SuperPoint | SuperPoint | 27.03 | 65.22 | 75.54 | 70.16 | 86.91 | 97.91 |
| | PUMP (S) | 32.48 | 71.44 | 78.81 | 67.54 | 81.68 | 93.19 |
| | PUMP (S + U) | 33.36 | 73.41 | 81.4 | 74.35 | 87.96 | 98.43 |
| | Abs. gain | ↑+0.9 | ↑+2.0 | ↑+2.6 | ↑+6.2 | ↑+6.3 | ↑+5.2 |

Figure 7:
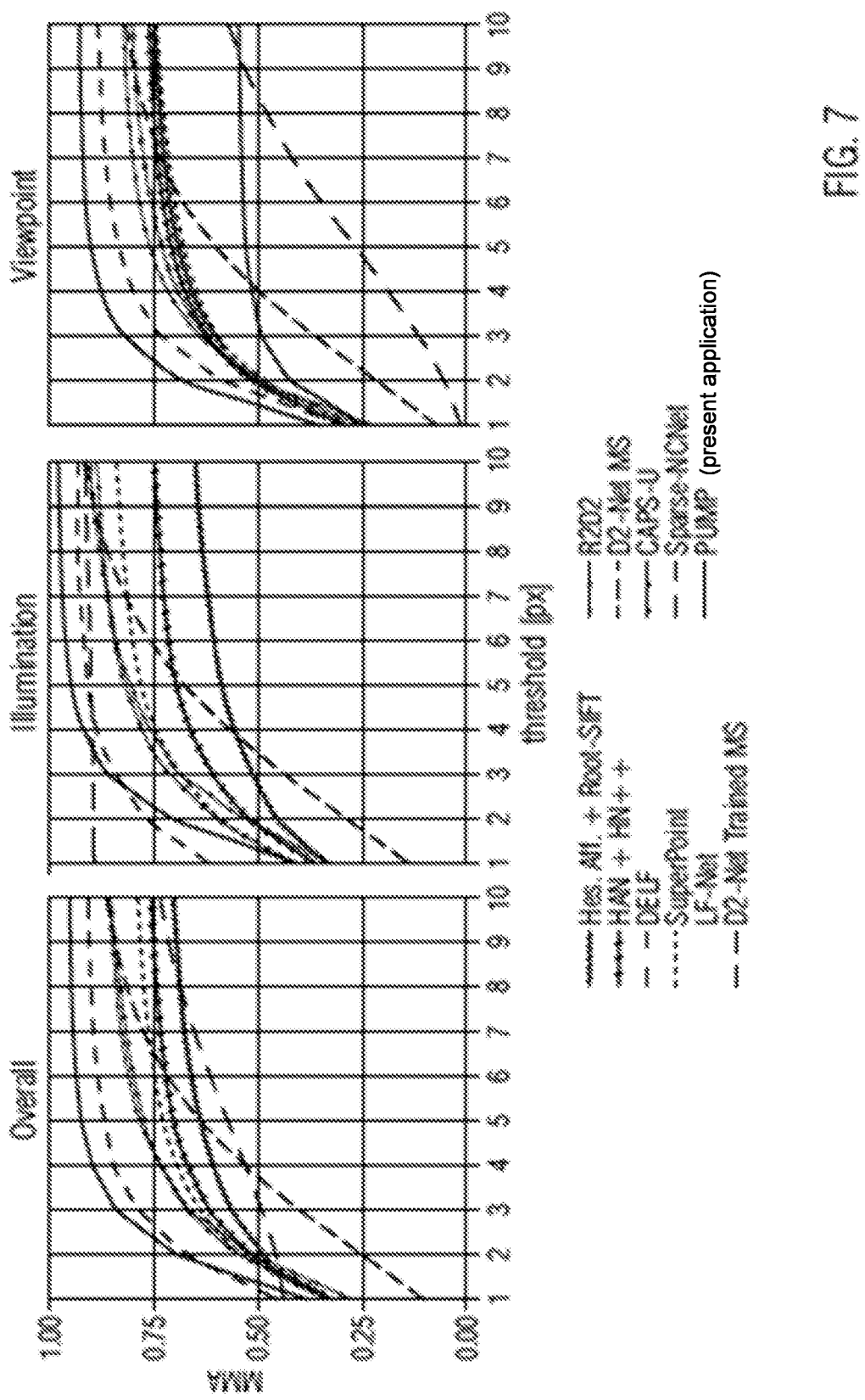
FIG. 7 is a series of graphs showing a comparison of experimental sparse matching evaluation results on the HPatches data set for a number of different techniques.

FIG. 7 illustrates a comparison of the performance of models according to the present invention with the state of the art on HPatches (in this case R2D2's keypoint detector is used to extract the keypoints). FIG. 7 shows matching results on the HPatches dataset in terms of Mean Matching Accuracy (MMA) for various error thresholds. The models according to the present application significantly outperform methods.

Although the above embodiments have been described within the context of method steps, they also represent a description of a corresponding component, module or feature of a corresponding apparatus or system.

Figure 8:
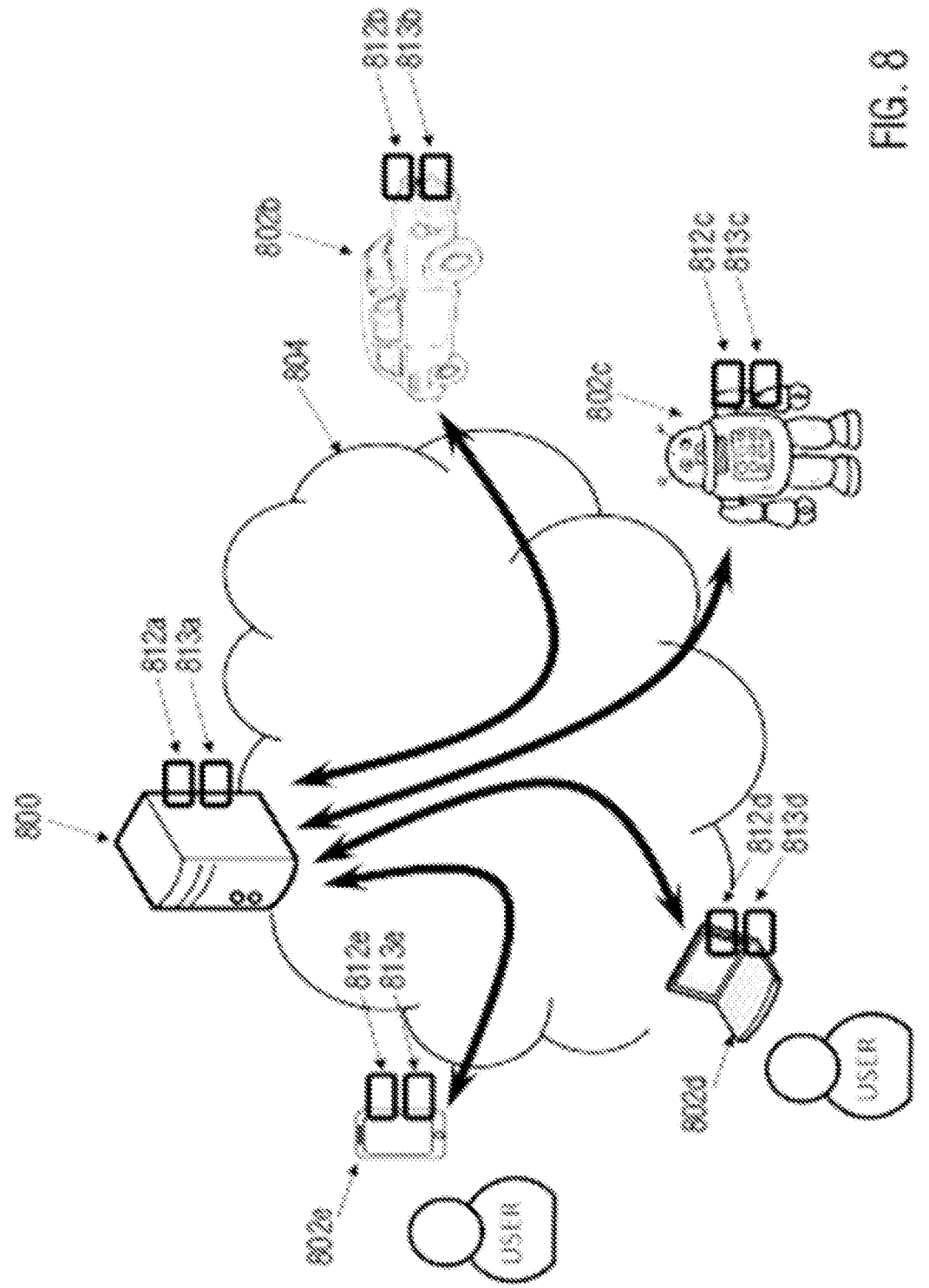
FIG. 8 illustrates an example system architecture in which the disclosed functions may be performed.

The above-mentioned methods and examples may be implemented within a system architecture such as illustrated in FIG. 8, which includes server 800 and one or more computing devices 802 that communicate over a network 804 (which may be wireless and/or wired), such as the Internet, for data exchange. Server 800 and the computing devices 802 each include a data processor (812a-e, collectively 812) and memory (813a-3, collectively 813) such as a disk drive. The computing devices 802 may be any type of computing device, such as a computing device that communicates with server 800, including autonomous vehicle 802b, robot 802c, computer 802d, or cellular phone 802e.

In an example, the method 500 for unsupervised neural network training for learning of local image descriptors is performed by server 800. The server 800 may provide the trained neural network module (e.g. trained neural network module 230) to a computing device, which may then perform method 600 using the received trained neural network module to compute optimal local image descriptors for determining whether a true match exists between image pairs (e.g., an image stored in memory and an image received by a camera of the computing device). In various embodiments, the determination that a true match exists is used in different applications including, visual localization and mapping, navigation, pose estimation, Structure-from-Motion, three dimensional (3D) reconstruction, and image search that rely on such descriptors. In an example, one of the computing devices 802 performs both methods 500 and 600. In a further example, autonomous vehicle 802b (or robot 802c) includes an optical sensor (e.g., one or more cameras) which obtains a first image of the surroundings of the vehicle (or the robot). In addition, the vehicle (or the robot) stores a second image (with location information) of the surroundings of the vehicle (or the robot) on memory device 813b/c. Processor(s) 812b (or 812c) then performs method 600 with the first and second image to identify corresponding portions in the images to determine a position of the vehicle (or the robot) within the surroundings of the vehicle (or the robot) via visual localization. In various implementations, an image from a camera or optical sensor may be compared with multiple images stored in a database to identify a match between an object in the received image with one or more of the stored image.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method comprising:
obtaining a pair of images depicting a same scene, the pair of images including a first image with a first pixel grid and a second image with a second pixel grid, wherein the first pixel grid is different than the second pixel grid;
by a neural network module having a first set of parameters:
generating a first feature map based on the first image; and
generating a second feature map based on the second image,
the first feature map including a first grid of image descriptors and the second feature map including a second grid of image descriptors,
wherein each image descriptor in the first grid corresponds to a respective pixel within the first pixel grid and each local image descriptor in the second grid corresponds to a respective pixel within the second pixel grid;
determining a first correlation volume based on the first and second feature maps, wherein the first correlation volume includes correlations of (a) pixels of the first pixel grid with (b) pixels of the second pixel grid, wherein each correlation between a pixel of the first pixel grid and a pixel of the second pixel grid is determined based on the image descriptors corresponding to the correlated pixels;

iteratively determining a second correlation volume based on the first correlation volume;

determining a loss for the first and second feature maps based on the second correlation volume;

generating a second set of the parameters for the neural network module based on minimizing a loss function using the loss;

and updating the neural network module to include the second set of parameters thereby generating a trained neural network module.

2. The method of claim 1, further comprising:

by the trained neural network module:

generating a third feature map based on a third image, the third feature map including a third grid of image descriptors; and generating a fourth feature map based on a fourth image, the fourth feature map including a fourth grid of image descriptors; and based on the third and fourth grids, identifying a first portion of the third image that corresponds to a second portion of the fourth image.

3. The method of claim 1 wherein the second image is a synthetic version of the first image generated via data augmentation, and wherein iteratively determining the second correlation volume includes determining the second correlation volume using iterative pyramid construction.

4. The method of claim 3 further comprising:

determining a second loss based on the first grid of image descriptors, the second grid of image descriptors, and ground-truth correspondences between the first and second images, wherein generating the second set of the parameters for the neural network module includes generating the second set of parameters for the neural network module based on minimizing a loss function using the loss and the second loss.

5. The method of claim 4 wherein generating the second set of the parameters for the neural network module includes generating the second set of parameters for the neural network module based on minimizing a loss function based on a sum of the loss and the second loss.

6. The method of claim 5 wherein the sum is a weighted sum.

7. The method of claim 1, wherein determining the second correlation volume includes:

generating a first level correlation volume based on first-level correlations between first-level patches of the first pixel grid and first-level patches of the second pixel grid; and for N between 1 and L−1, iteratively aggregating N+1 level correlations of an nth level correlation volume to N+1 level correlations between N+1 level patches of the first pixel grid and N+1 level patches of the second pixel grid.

8. The method of claim 7 wherein the N+1 level patches including neighboring N level patches of the respective pixel grid and the aggregated N level correlations correspond to the neighboring N-level patches of the correlated N+1 level patches.

9. The method of claim 7, wherein generating the first level correlation volume includes determining a first-level correlations between a first-level patch of the first pixel grid and a first-level patch of the second pixel grid as an averaged sum of correlations between corresponding pixels in the first-level patch of the first pixel grid and the first-level patch of the second pixel grid.

10. The method of claim 7, wherein each N+1 level patch includes 2×2 n-level patches of the respective pixel grid.

11. The method of claim 7, wherein determining the N-th level correlation volume includes performing a rectification transformation for each N-level correlation of the N-th level correlation volume.

12. The method of claim 1, wherein the first correlation volume has a first dimension corresponding to a first dimension of the first feature map and a second dimension corresponding to a second dimension of the first feature map.

13. The method of claim 1 wherein generating the first correlation volume includes subsampling the first feature map by a predetermined factor in the first and second dimensions and generating a subsampled feature map having a third dimension that is less than the first dimension and a fourth dimension that is less than the second dimension.

14. The method of claim 13, wherein subsampling the first feature map includes:

dividing the first pixel grid in non-overlapping patches, each patch including a plurality of pixels; and for each patch, determining one descriptor based on the image descriptors corresponding to the pixels of that patch, wherein the one descriptor represents all pixels of that patch in the subsampled feature map.

15. The method of claim 14, wherein determining the first correlation volume includes for each patch of the first pixel grid, determining correlations of the patch with each pixel of the second pixel grid, each correlation being determined based on the one descriptor representing the respective patch in the subsampled feature map and the one descriptor of the second feature map corresponding to the correlated pixel of the second pixel grid.

16. The method of claim 14, wherein each patch has a size of 4×4 pixels, the first dimension is 4× the third dimension, and the second dimension is 4× the fourth dimension.

17. The method of claim 1 further comprising:

using the trained neural network module and the second set of parameters, extracting correspondences between portions of a second image pair;

based on the extracted correspondences, determining whether the portions of the second image pair include the same scene; and outputting an indicator of whether the portions of the second image pair include the same scene.

18. A system comprising:

a neural network module configured to, using trainable parameters:

generate a first feature map based on a first image of an image pair; and generate a second feature map based on a second image of the image pair, the first feature map including a first grid of image descriptors and the second feature map including a second grid of image descriptors, at least a portion of the first image including a scene and at least a portion of the second image including the scene;

a correlation module configured to determine a loss based on the first and second feature maps; and a training module configured to train the trainable parameters based on minimizing the loss.

19. The system of claim 18 wherein the training module is configured to train the trainable parameters without labels indicative of correspondences between the portions of the first and second images.

20. The system of claim 18 further comprising a matching module configured to, after the training:

extract correspondences between feature maps generated by the neural network module based on received images, respectively;

based on the correspondences, determine whether the received images include the same scene; and output an indicator of whether the received images include the same scene.

21. A computer-implemented method for identifying correspondences between an input images pair, comprising:

receiving the input image pair including a first input image and a second input image;

processing the input image pair with a neural network trained by performing a method of unsupervised learning of local image descriptors, the trained neural network generating local image descriptors for the input image pair;

extracting correspondences between portions of the input image pair based on the image descriptors, each extracted correspondence mapping a portion of the first input image to a portion of the second input image;

determining with the extracted correspondences whether a true match exists between the input image pair, the true match existing between the input image pair when corresponding portions of the image pair depict a same scene; and outputting whether the true match exists between the image pair;

wherein the method of unsupervised learning of local image descriptors for training the neural network comprises:

obtaining a first pair of training images depicting a same scene, the pair of training images including a first training image with a first pixel grid and a second training image with a second pixel grid, wherein the first pixel grid differs from the second pixel grid;

applying the neural network having an initial set of parameters to the first training image and the second training image to generate a first feature map for the first training image and a second feature map for the second training image, the first feature map comprising a first grid of local image descriptors and the second feature map comprising a second grid of local image descriptors, wherein each local image descriptor in the first grid of local image descriptors corresponds to a respective pixel within the first pixel grid and each local image descriptor in the second grid of local image descriptors corresponds to a respective pixel within the second pixel grid;

determining an initial correlation volume based on the first and second feature maps, wherein the initial correlation volume comprises local correlations of pixels of the first pixel grid with pixels of the second pixel grid, wherein each local correlation between a pixel of the first pixel grid and a pixel of the second pixel grid is determined based on the local image descriptors corresponding to the correlated pixels;

iteratively determining a second correlation volume based on the initial correlation volume, wherein the second correlation volume comprises aggregated high-level correlations between iteratively constructed high-level patches of the first and second pixel grids;

determining a uniqueness matching loss for the first and second feature maps based on the second correlation volume, the uniqueness matching loss providing a measure for a deviation of the first and second feature maps from optimal feature maps; and training the neural network by minimizing a loss function based on the uniqueness matching loss to generate an optimized set of parameters.

22. A computer-implemented method of unsupervised neural network training, the method comprising: obtaining a first pair of images depicting a same scene, the pair of images including a first image with a first pixel grid and a second image with a second pixel grid, wherein the first pixel grid differs from the second pixel grid;

applying a neural network having an initial set of parameters to the first image and the second image to generate a first feature map for the first image and a second feature map for the second image, the first feature map comprising a first grid of local image descriptors and the second feature map comprising a second grid of local image descriptors, wherein each local image descriptor in the first grid of local image descriptors corresponds to a respective pixel within the first pixel grid and each local image descriptor in the second grid of local image descriptors corresponds to a respective pixel within the second pixel grid;

determining an initial correlation volume based on the first and second feature maps, wherein the initial correlation volume comprises local correlations of pixels of the first pixel grid with pixels of the second pixel grid, wherein each local correlation between a pixel of the first pixel grid and a pixel of the second pixel grid is determined based on the local image descriptors corresponding to the correlated pixels;

iteratively determining a second correlation volume based on the initial correlation volume, wherein the second correlation volume comprises aggregated correlations between iteratively constructed patches of the first and second pixel grids;

determining a uniqueness matching loss for the first and second feature maps based on the second correlation volume, the uniqueness matching loss providing a measure for a deviation of the first and second feature maps from optimal feature maps;

and training the neural network by minimizing a loss function based on the uniqueness matching loss to generate an optimized set of parameters, thereby generating a trained neural network adapted for determining optimal local image descriptors.

23. The method of claim 22, wherein iteratively determining the second correlation volume based on the first correlation volume is determined by iterative pyramid construction, and wherein each patch is a rectangular portion of the respective pixel grid.

24. The method of claim 23, wherein the measure of deviation from optimal feature maps is low if, based on the high-level correlations in the second correlation volume, each patch of the first and the second pixel grids has a unique match among the patches of the respective other pixel grid.

* * * * *